US011878457B2

(12) United States Patent
Bianconi

(10) Patent No.: US 11,878,457 B2
(45) Date of Patent: Jan. 23, 2024

(54) SYSTEMS AND METHODS FOR PROVIDING HEAT TO ARTICLES USING HEATED FORMABLE MEDIA

(71) Applicant: NIKE, Inc., Beaverton, OR (US)

(72) Inventor: Mirko Bianconi, Verona (IT)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 17/668,609

(22) Filed: Feb. 10, 2022

(65) Prior Publication Data

US 2022/0266500 A1 Aug. 25, 2022

Related U.S. Application Data

(60) Provisional application No. 63/239,707, filed on Sep. 1, 2021, provisional application No. 63/148,983, filed on Feb. 12, 2021.

(51) Int. Cl.
*B29C 51/18* (2006.01)
*B29C 51/10* (2006.01)
*B29C 51/36* (2006.01)
*B29C 51/42* (2006.01)
*B29L 31/50* (2006.01)

(52) U.S. Cl.
CPC .............. *B29C 51/18* (2013.01); *B29C 51/10* (2013.01); *B29C 51/36* (2013.01); *B29C 51/428* (2013.01); *B29L 2031/505* (2013.01)

(58) Field of Classification Search
CPC ....... B29C 51/36; B29C 51/10; B29C 51/428; B29C 51/18; B29D 35/009; B29D 35/122; B29D 35/126; B29D 35/128; B29D 35/0054; B29L 2031/505

See application file for complete search history.

(56) References Cited

U.S. PATENT DOCUMENTS

| | | | |
|---|---|---|---|
| 2014/0239556 | A1 | 8/2014 | Fisher et al. |
| 2016/0206046 | A1 | 7/2016 | Cross |
| 2019/0329483 | A1 | 10/2019 | Bianconi et al. |

FOREIGN PATENT DOCUMENTS

| | | |
|---|---|---|
| CN | 105495855 A | 4/2016 |
| WO | 2015184338 A1 | 12/2015 |

OTHER PUBLICATIONS

International Search Report and Written Opinion received for PCT Patent Application No. PCT/US2022/016077, dated May 11, 2022, 15 pages.

*Primary Examiner* — Monica A Huson
(74) *Attorney, Agent, or Firm* — Shook, Hardy & Bacon L.L.P.

(57) ABSTRACT

Systems and methods for providing heat to a three-dimensional article are disclosed. The method can include inserting at least a portion of the article over a form. The method can further include inserting the form and article at least partially within an article container and moving the form and article into engagement with a flexible membrane where the membrane and the article container form an airtight chamber. The method can further include exposing the airtight chamber to a pressure less than atmospheric pressure to pull the membrane against at least a portion of the article and exposing the membrane to a heated deformable media.

16 Claims, 34 Drawing Sheets

SYSTEMS AND METHODS FOR PROVIDING HEAT TO ARTICLES USING HEATED FORMABLE MEDIA

CROSS-REFERENCE TO RELATED APPLICATIONS

This application claims priority to U.S. Provisional Patent App. No. 63/148,983, filed Feb. 12, 2021, and titled "Systems and Methods for Providing Heat to Articles Using Heated Formable Media" and to U.S. Provisional Patent App. No. 63/239,707, filed Sep. 1, 2021, and titled "Systems and Methods for Providing Heat to Articles Using Heated Formable Media". These applications are assigned to the same entity as the present application, and are incorporated herein by reference in the entirety.

TECHNICAL FIELD

The present disclosure is directed to a system and methods for providing heat to articles, such as thermocoupling an article shape or attaching an element to an article.

BACKGROUND

Heat can be provided to certain articles, such as knit articles having thermo-fuse-able yarns, to form the article to a desired shape. Attaching an element to an article can include heating a thermo-adhesive to couple an element to an article.

BRIEF DESCRIPTION OF THE SEVERAL VIEWS OF THE DRAWINGS

Illustrative aspects of the present invention are described in detail below with reference to the attached drawing figures, which are incorporated by reference herein and wherein.

DETAILED DESCRIPTION

Figure 1:
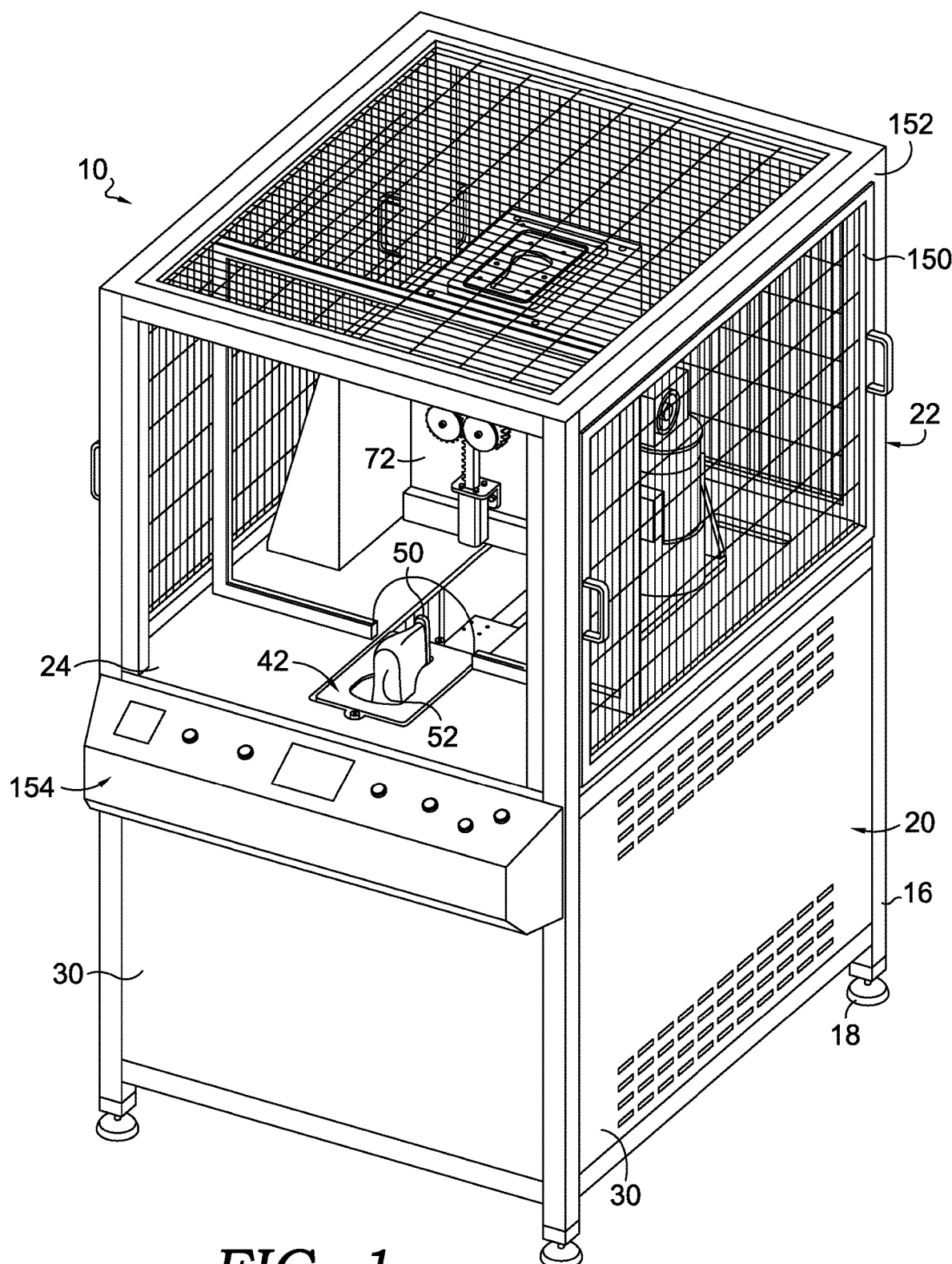
FIG. 1 depicts a perspective view of a system for providing heat to an article, in accordance with aspects hereof.

The subject matter of aspects of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects herein are directed to methods and systems for providing heat to articles and/or for coupling elements to articles. In some aspects, methods and systems are directed to attaching an element to an article. Certain attaching systems can include heating an element and an article with heating lamps to re-activate cements or other thermo-adhesives. These lamps generate high temperatures that can limit the types of elements and articles to be joined. In addition, these systems and methods are often labor-intensive, and result in poor consistency in terms of quality and performance.

The systems and methods disclosed herein can alleviate one or more of the above-mentioned problems. At a high level, the methods disclosed herein can aid in coupling an element to a three-dimensional article, such as a footwear upper. The method can include inserting at least a portion of the article over a form, and placing the element on the article in a desired location. The method can further include inserting the form, article and element at least partially within an article container and moving the form, article and element into engagement with a flexible membrane where the membrane and the article container form an airtight chamber. The method can further include exposing the airtight chamber to a pressure less than atmospheric pressure to pull the membrane against at least a portion of the article and the element and exposing the membrane to a heated deformable media.

In another aspect, a system for providing heat to a three-dimensional article is provided. The system may include an article container having an interior volume, and at least one open face. The system may also include a form selectively held at least partially within the article container. The form may have a shape at least partially corresponding to the three-dimensional article, and adapted to hold the three-dimensional article. The system may also include a media container having a first chamber and a second chamber that are separated by a selectively openable valve. The system may have a flexible membrane extending at least partially across a face of the second chamber of the media container. A deformable media may be held within the media container; the deformable media being held within the first chamber in a first condition when the selectively openable valve is in a closed position, and the deformable media being allowed to enter the second chamber when the selectively openable valve is in an open position. The system may also include at least one heating element positioned to heat the deformable media when the deformable media is in the first chamber of the media container. The system may also include an engagement mechanism coupled to the article container and adapted to move the article container such that the form having the three-dimensional article and the element are moved into engagement with the flexible membrane on the media container. The deformable media can be heated by the at least one heating element when the deformable media is in the first chamber and the heated deformable media is allowed to enter the second chamber by opening the selectively openable valve. This allows the deformable media to surround the flexible membrane.

In yet another aspect, a method for providing heat to an article is provided. The method can include inserting at least a portion of the article over a form. The method can further include inserting the form and article at least partially within an article container and moving the form and article into engagement with a flexible membrane. The method can further include exposing the membrane to a heated deformable media.

Figure 1A:
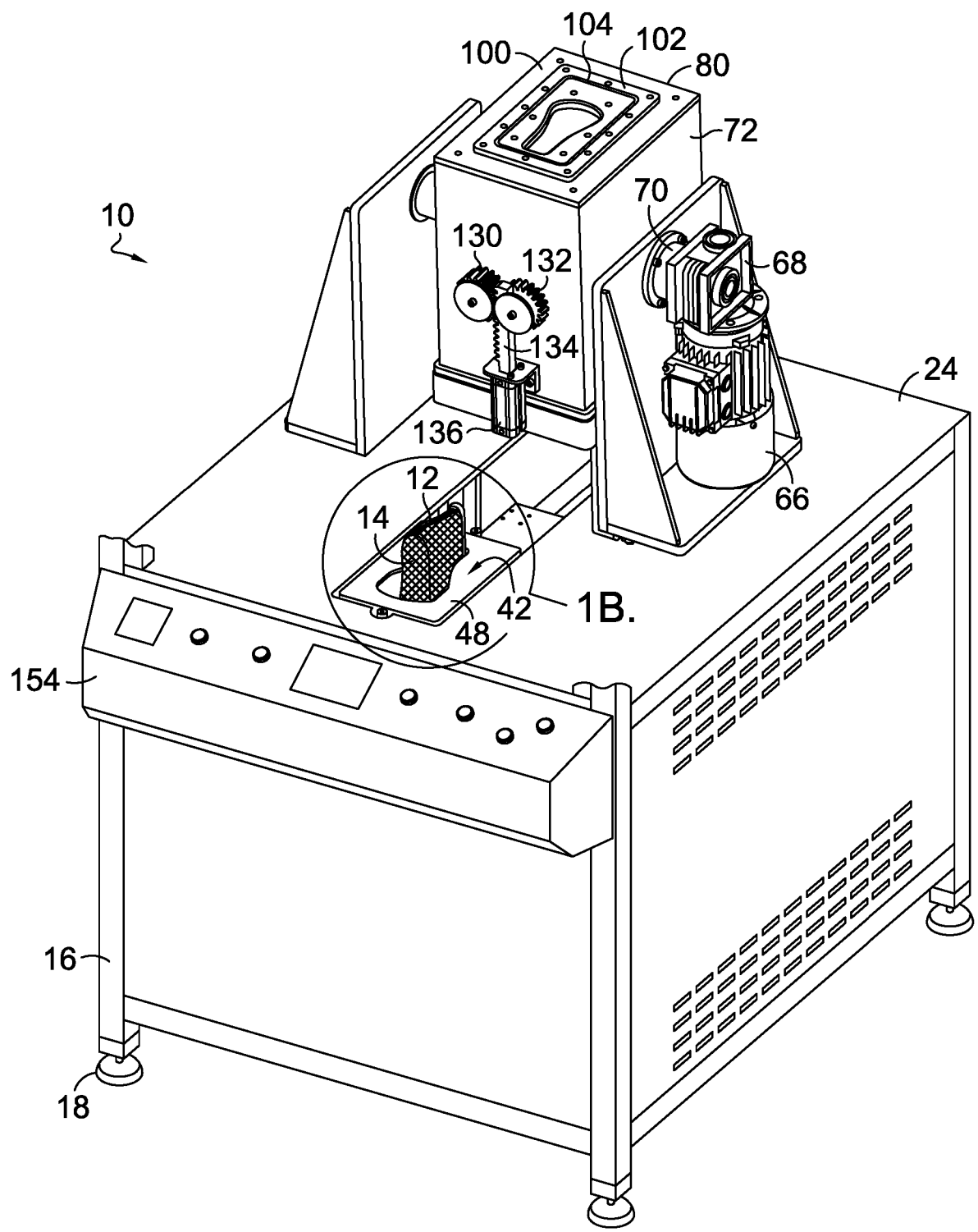
FIG. 1A depicts a perspective view similar to FIG. 1 but with an article and an element in place, and guard panels removed to show details of construction, in accordance with aspects hereof.
Figure 1B:
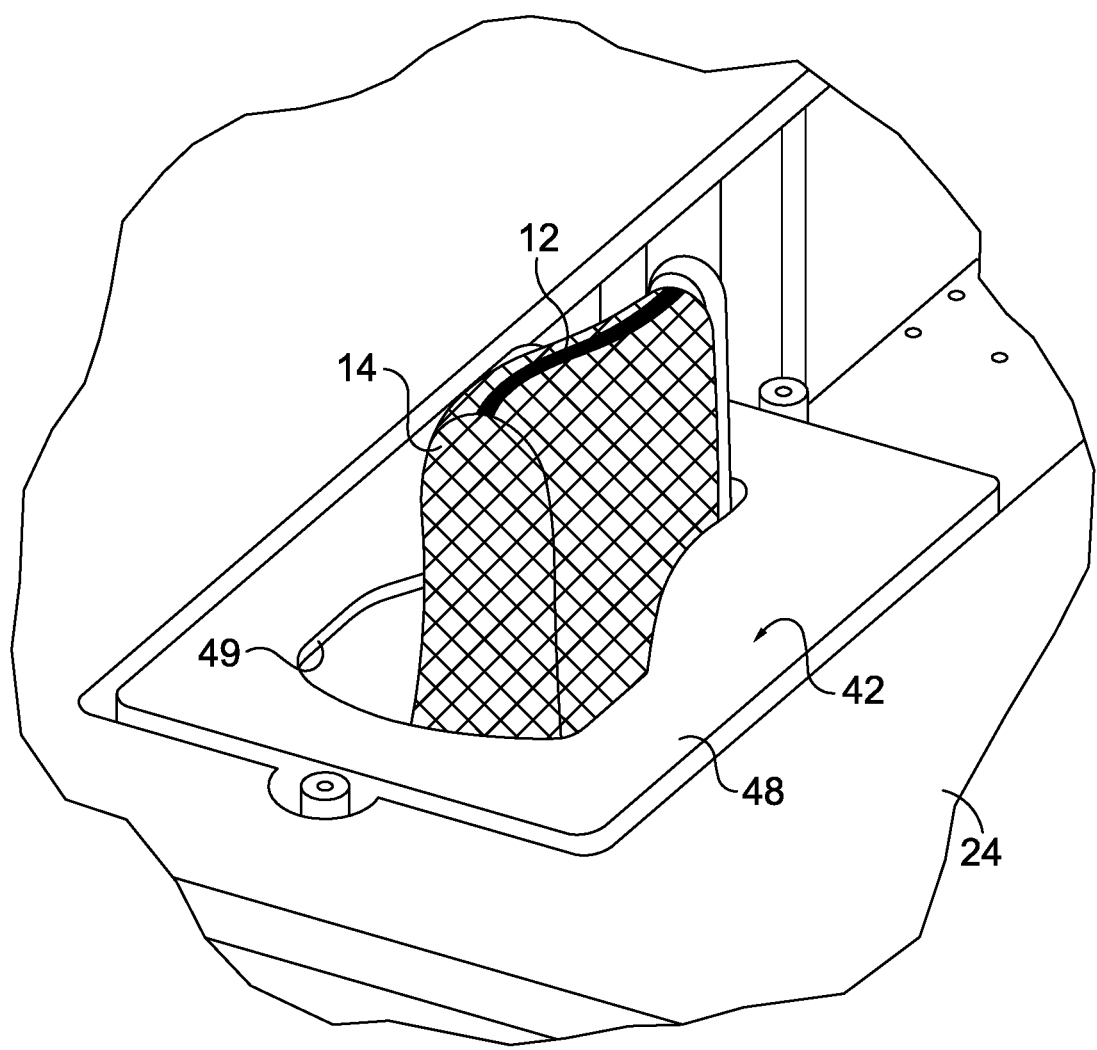
FIG. 1B depicts an enlarged view of the encircled region 1B shown in FIG. 1A, in accordance with aspects hereof.

Turning now to the figures, FIG. 1 depicts a system 10 for providing heat to an article 14. In some aspects, the system 10 can be used to thermo-couple or attach an element 12 to an article 14 (as best seen in FIG. 1B). In some aspects, the article 14 is an article of footwear, such as an upper. In some aspects, the article 14 is a three-dimensional upper made of a fabric, and in some aspects, the fabric is a woven, knit or braided material. It should be understood, that while the system 10 depicts the article 14 as a portion of an article of footwear, e.g., an upper, other types of articles or other portions of an article of footwear can be utilized in the system 10 described herein. In some aspects, the system 10 is used to provide the article 14 with a three-dimensional shape by providing heat to the article 14. In some aspects, the article 14 may be constructed from thermo-fuse-able materials, such as knit yarns have a desired melting temperature. In some aspects, the element 12 is an accompanying part of a footwear upper, and in some aspects is a heel counter. It should be understood that element 12 could be any of a number of different elements coupled to the article 14, e.g. a midsole, an outsole, aesthetic embellishments, a toe support, a foxing strip or other footwear elements. In some aspects, the article 14 and/or the element 12 are of a thermoformable or thermoplastic material, or have a layer of thermoformable or thermally activated material thereon, that, when heated, forms the article 14 into a desired three-dimensional shape and/or bonds or attaches the article 14 to the element 12.

Figure 3:
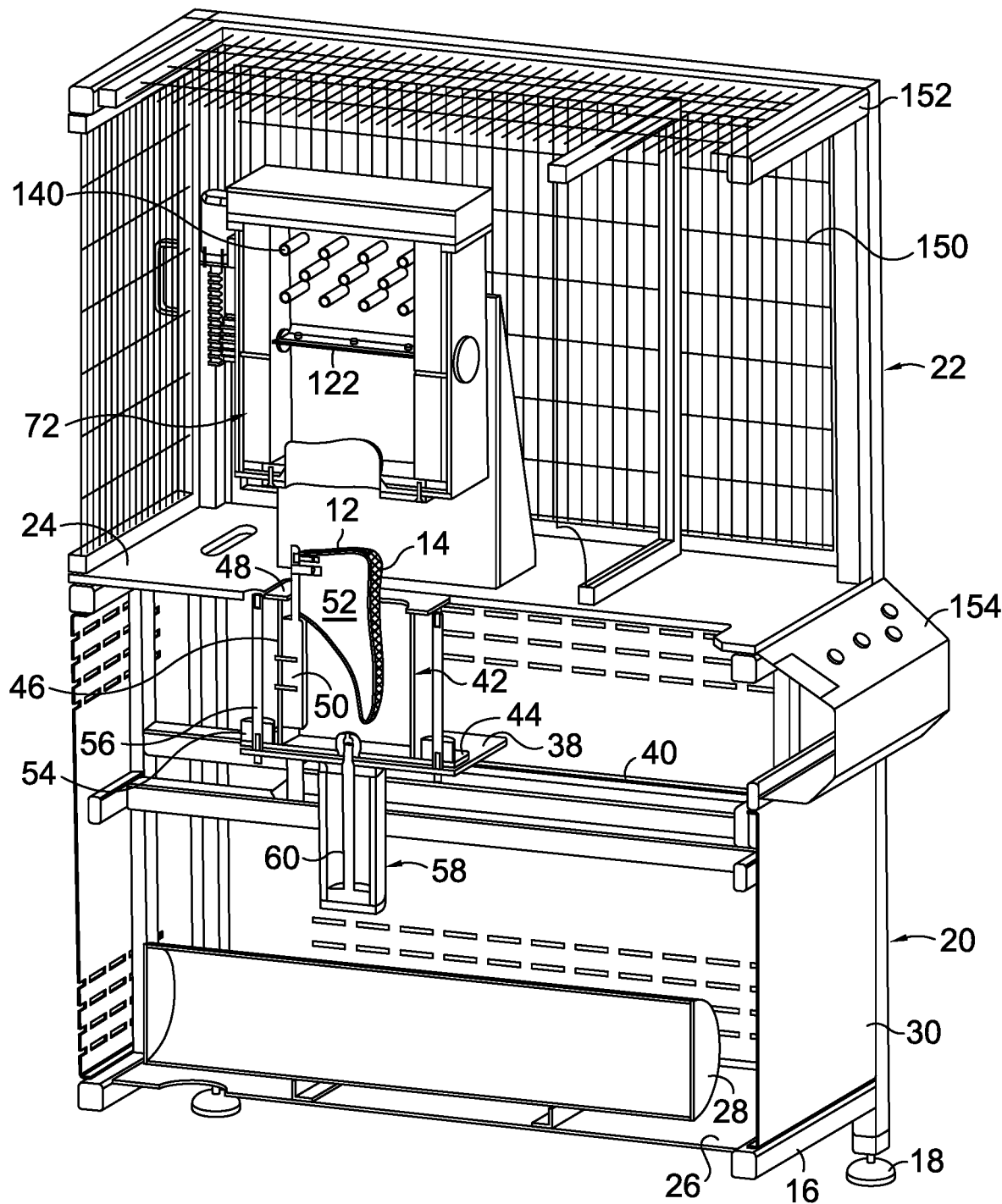
FIG. 3 depicts a cross-section taken along line 3-3 of FIG. 2, but with the guard panels in place, in accordance with aspects hereof.

In some aspects, the system 10 has an outer supportive frame 16. In some aspects, the frame 16 is made from square metal tubing, but could also be any of a number of rigid materials. The frame 16 can be supported on a surface with a plurality of feet 18. As best seen in FIG. 3, the frame includes a lower portion 20 and an upper portion 22, separated by an upper plate 24. The lower portion 20 supports a lower plate 26 that in turn supports a vacuum tank 28. The upper plate 24 and the lower plate 26, in some aspects, are made of rigid materials, such as a metal. The lower portion 20 can be enclosed with outer guard panels 30 to prevent access to the internal components of the lower portion 20.

Figure 12:
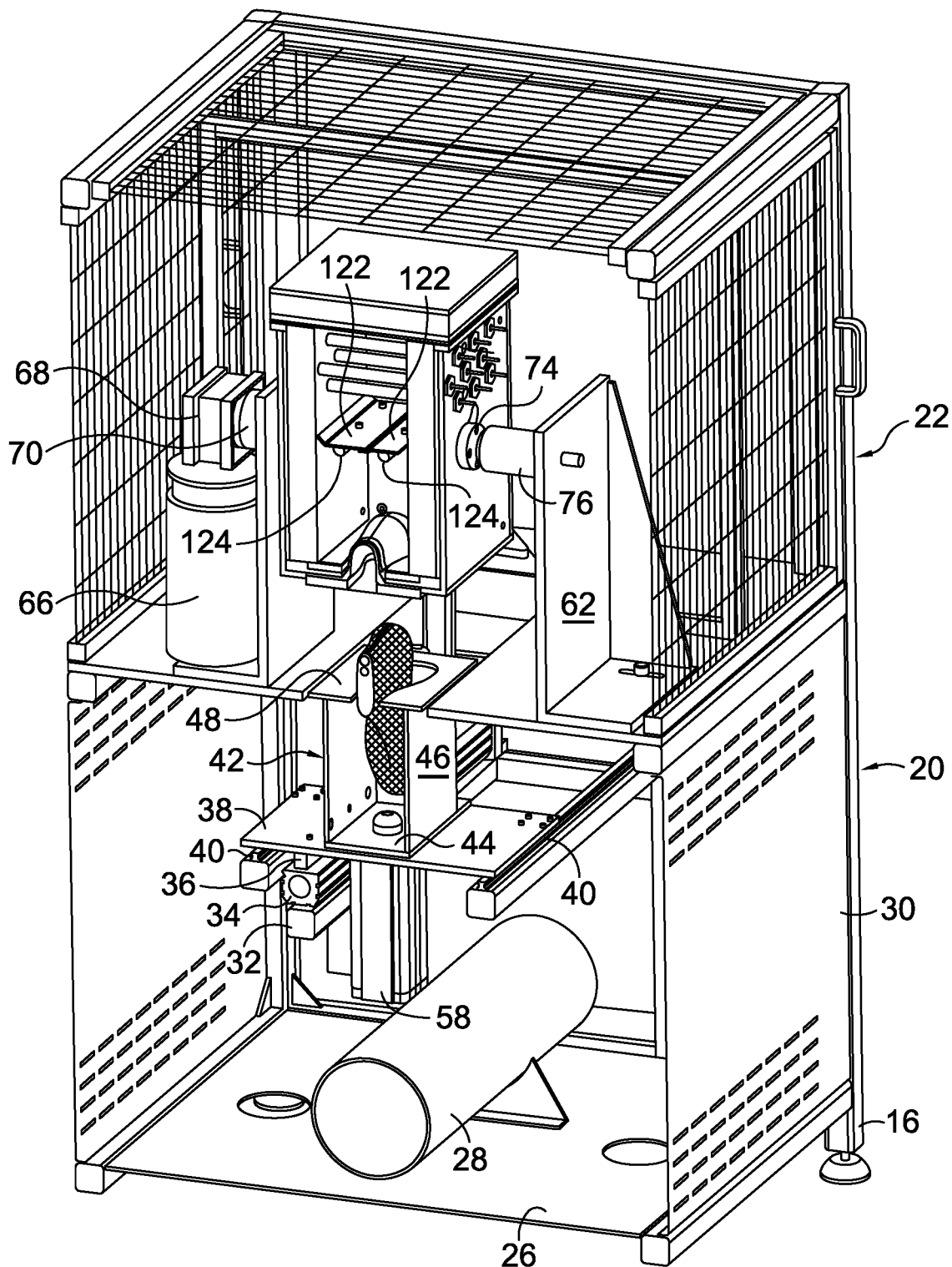
FIG. 12 is a cross-section taken along line 12-12 of FIG. 9A.

As seen in FIG. 12, the lower portion 20 also includes a cross-support 32 rigidly secured to the frame 16, extending from one end of the frame 16 to the other end of the frame 16. The cross-support 32 supports a linear actuator 34. In some aspects, the linear actuator 34 is a rod-less pneumatic cylinder, but it should be understood that the linear actuator 36 could be any of a number of devices to effect linear translation. The linear actuator 34 moves a bracket 36 along the length of the linear actuator 34. It should be understood that, while not shown, the actuator 34 is coupled to a power source, such as a compressed air supply, or electricity to effect movement of the bracket 36. The bracket 36 is also coupled to a vacuum slide plate 38. The vacuum slide plate 38 moves with the bracket 36, and is also supported on each side by a linear guide 40. The linear guides 40 allow the vacuum slide plate 38 to translate along the path of the linear actuator 34. The vacuum slide plate 38 also supports an article container 42. Through the activation of the linear actuator 34, the article container 42 is translated from a loading position, as shown in FIG. 1A, to a forward position, as shown in FIG. 2.

Figure 4:
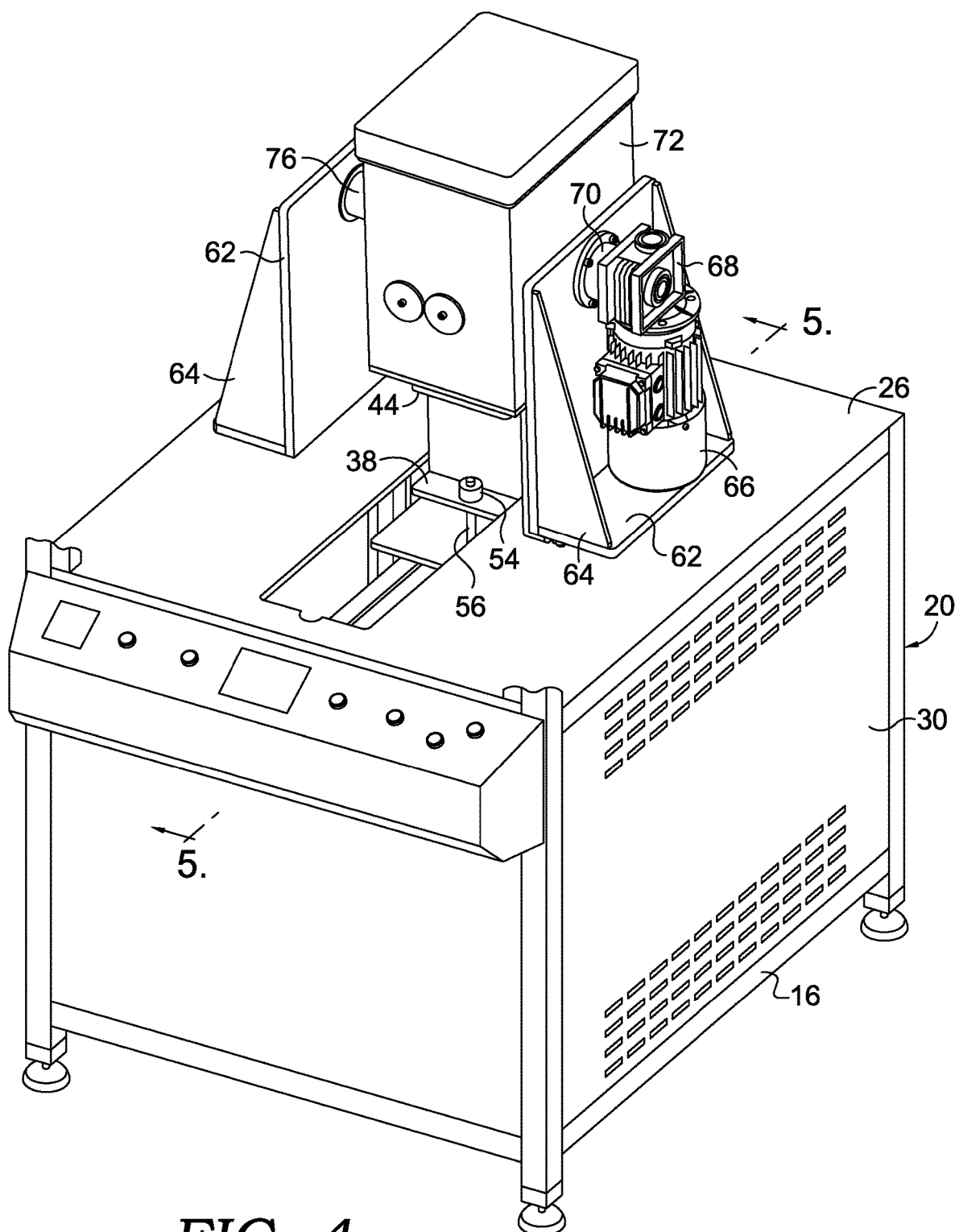
FIG. 4 depicts a perspective view similar to FIG. 2, but with the article container raised, in accordance with aspects hereof.
Figure 5:
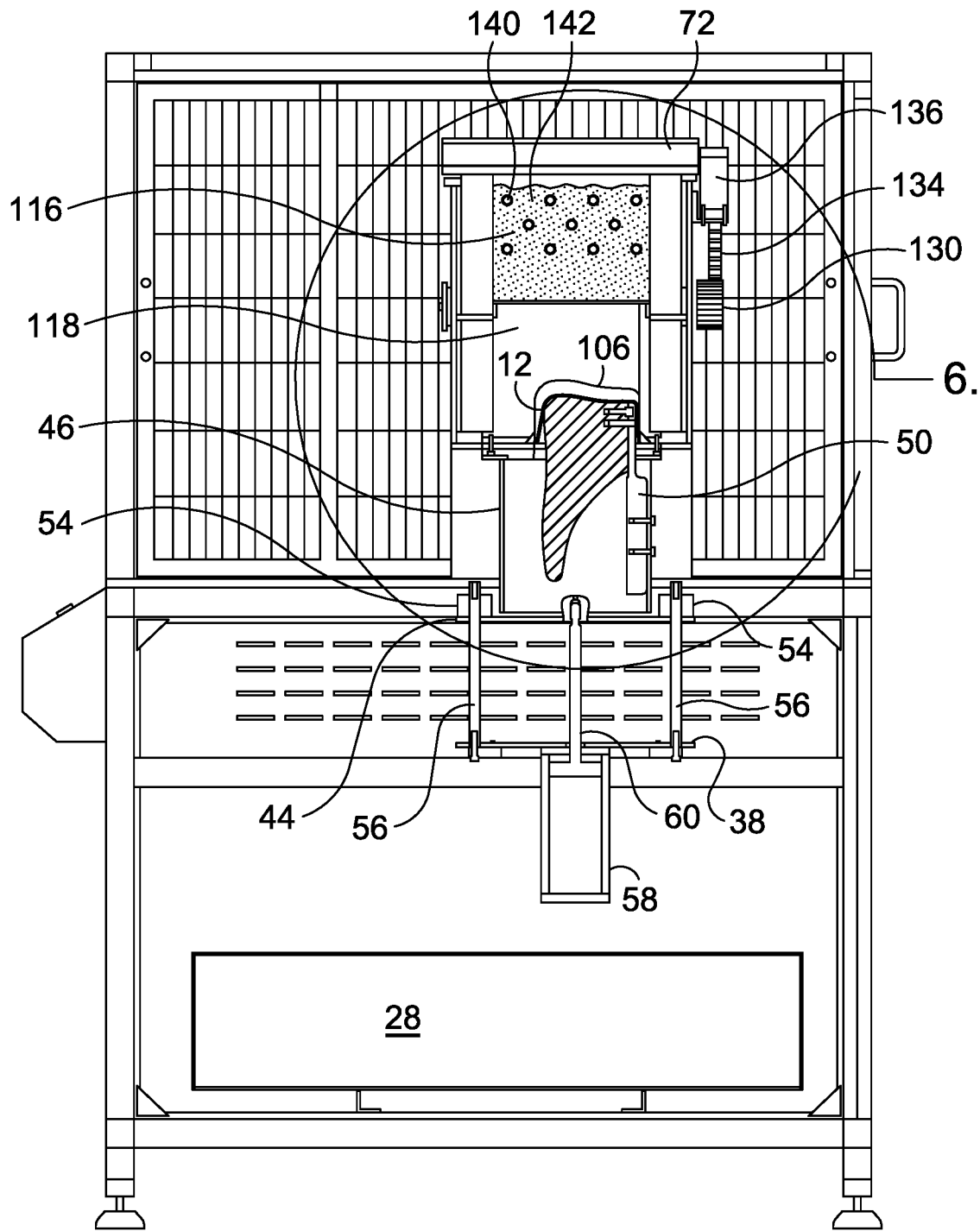
FIG. 5 depicts a cross-section taken along line 5-5 of FIG. 4, but with the guard panels in place, in accordance with aspects hereof.

The article container 42 is best seen in FIGS. 3 and 12. The article container 42 has a base 44 that supports a tank 46 and a lid 48. The base 44, the tank 46 and the lid 48 define an internal volume. As shown in FIG. 1B, the lid 48 has an opening 49 that allows access to the internal volume, where the lid 48 and opening 49 form an open face of the article container 42. In some aspects, as shown in FIG. 3, the article container 42 has a bracket 50 that is used to selectively couple a form 52 to the article container 42. In some aspects, the bracket 50 has extending pins, and the form 52 has holes corresponding to the pins, to removably attach the form 52 to the bracket 50. In some aspects, when the form 52 is coupled to the bracket 50, a portion of the form 52 extends beyond the lid 48, with a portion of the form 52 extending into the internal volume of the article container 42. In some aspects, the form 52 is in the shape of an article of footwear, such as a footwear upper. In some aspects, the form 52 is a footwear last. Vacuum tubing (not shown) extends from the vacuum tank 28 to the article container 42 to pull negative pressure (a vacuum) on the internal volume of the article container, as is further described below. In some aspects, the form 52 is shaped to at least partially correspond to the shape of the article 14. In operation, the article 14 can be oriented on the form 52, and held on the form 52. In some aspects, the article 14 is held on the form 52 along with the element 12, and the assembly of the form 52, article 14 and element 12 can be coupled to the bracket 50, as is further described below. While only one form 52 is shown, in some aspects, the system 10 could be modified to operate with multiple stations of article containers 42, having one or multiple forms 52 per station. As best seen in FIG. 3, the base 44 of the article container 42 extends outwardly beyond the perimeter of the tank 46. This extending portion of the base 44 supports a pair of bushings 54. Each bushing 54 surrounds a column 56 that is coupled to the vacuum slide plate 38. The columns 56 extend upwardly from the base 44, and, together with the bushings 54, guide the article container 42 in vertical movement. In some aspects, the bushings 54 are bearings. To effect vertical movement of the article container 42, an actuator 58 is provided. In some aspects, the body of the actuator 58 is coupled to the underside of the vacuum slide plate 38. The actuator 58 also has an extending rod 60, the outer end of which is coupled to the base 44 of article container 42. In some aspects, the actuator 58 can be any of a number of different linear actuators, including, but not limited to, pneumatic cylinders, electric linear actuators or other types of linear drive systems. The actuator 58 selectively moves the article container 42 from a lower position, as shown in FIGS. 2 and 3, to a raised position, as shown in FIGS. 4 and 5, guided by bushings 54 and columns 56. It should be understood that, while not shown, the actuator 58 is coupled to a power source, such as a compressed air supply, or electricity to effect movement of the rod 60 and thus the article container 42.

Figure 2:
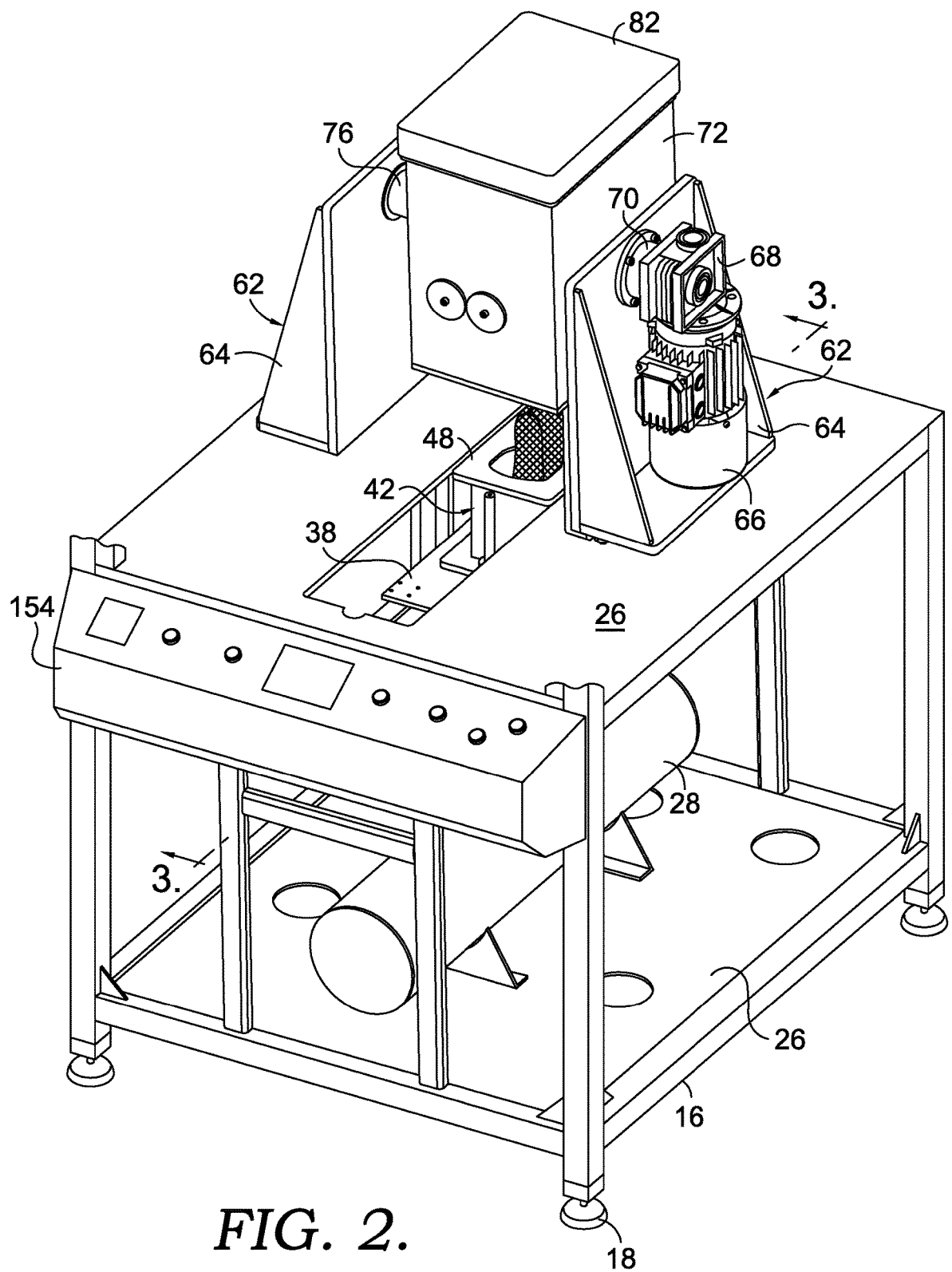
FIG. 2 depicts a perspective view similar to FIG. 1A but with an article container moved forward, and with further guard panels removed to show details of construction, in accordance with aspects hereof.

As best seen in FIGS. 2 and 12, the upper plate 26 has an opening therein that allows movement of the article container 42. A pair of brackets 62 are coupled to the upper plate 26 and extend upwardly therefrom. Each bracket 62 is made from a rigid, sturdy material, such as metal, and may have a reinforcing buttress 64 to provide additional strength and rigidity. One bracket 62 supports a motor 66 and in some aspects, a reducer 68. The motor 66 provides rotational output to selectively rotate a flange 70. The end of the flange 70 opposite the motor 66 is fixedly coupled to a media container 72. The opposite side of the media container 72 is also rotationally supported by an additional flange 74 that extends through the bracket 62. In some aspects, a bushing 76 is used to surround the flange 74, extending from the connection to the media container 72 to the bracket 62. As is further described below, the media container 72 is rotationally supported on the brackets 62 by the flange 70 and the flange 74. The media container 72 can be selectively rotated by activating motor 66, the importance of which is described below. While not shown, the motor 66 is coupled to an electrical power source.

Figure 11:
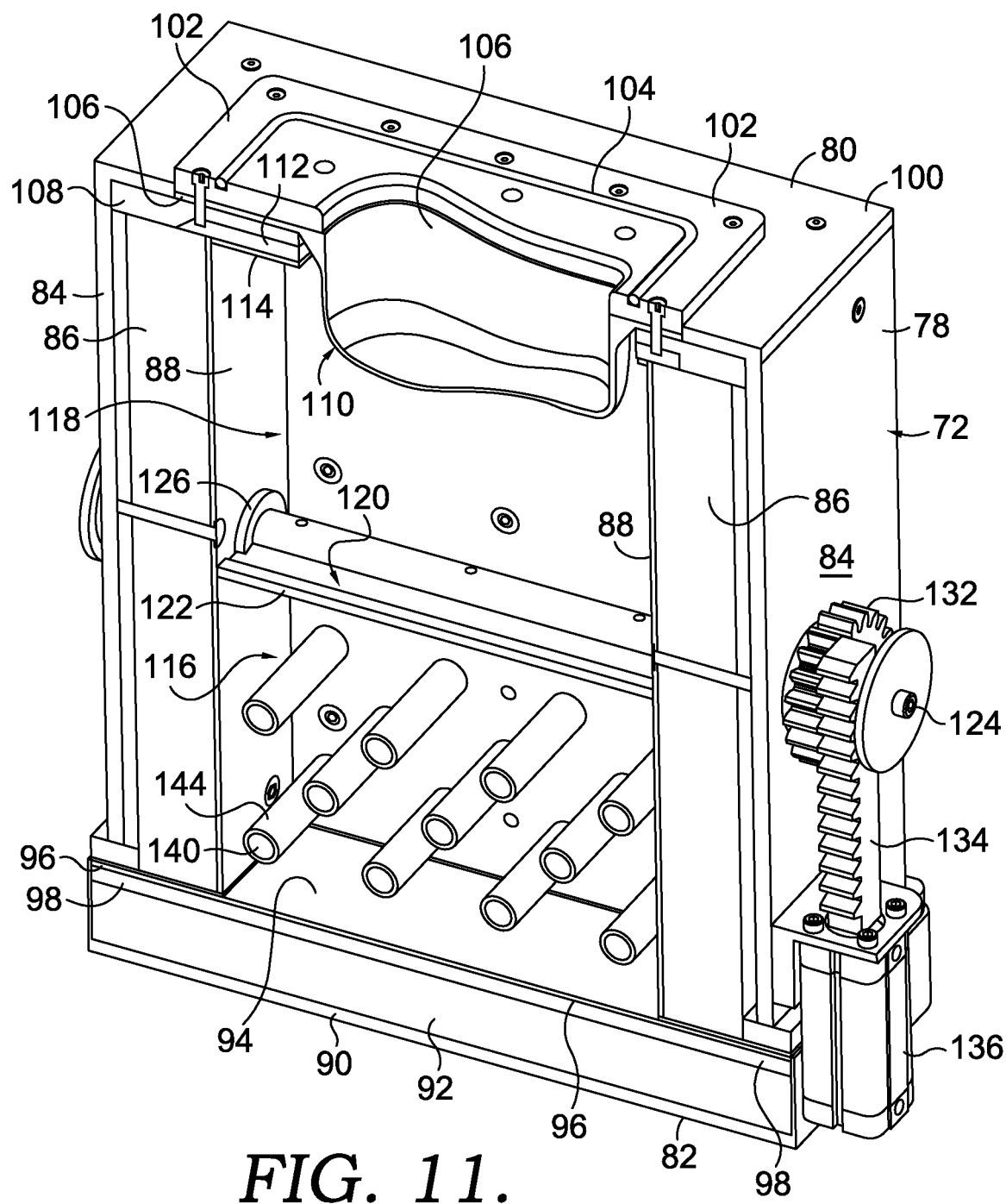
FIG. 11 is a cross-section of the media container taken along line 11-11 of FIG. 10A.

As best seen in FIG. 11, the media container 72 has an outer body 78, a cover 80 and a base 82. In some aspects, the external faces of outer body 78 may include external insulation panels 84, as best seen in FIG. 11. In some aspects, interior of panels 84, each side of the media container 72 may include a further insulation layer 86 and an interior plate 88. In some aspects, the base 82 surrounds a series of layers, including a first insulation layer 90, a second insulation layer 92, an internal cover 94 and a base gasket 96. In some aspects, the base gasket 96 is held between the internal cover 94 and a base frame 98 around the perimeter of the outer body 78, and between the internal cover 94 and the interior insulation layer 86.

On the other end of media container 72, the cover 80 includes an external insulation panel 100 that is similar to external insulation panels 84. The external insulation panel 100 surrounds a frame 102 that defines an opening shaped and sized to receive at least a portion of the assembly of the element 12, article 14 and the form 52. A gasket 104 forms a perimeter surrounding the opening in the frame 102. The gasket 104 selectively forms a seal with article container 42 when article container 42 is moved to a raised position as is further described below. As best seen in FIG. 11, a perimeter of a flexible membrane 106 is held between the frame 102 and an internal plate 108. The membrane 106 has a portion 110 that extends into the media container 72. In some aspects, the portion 110 is shaped to generally correspond to the portion of the form 52 that extends beyond the article container 42. In some aspects, the flexible membrane 106 is a silicon material with a thickness in the range of 1.4-1.6 millimeters. It should be understood that other flexible, heat resistant materials could also be used, and that other thickness ranges are contemplated. In some aspects, an additional insulation panel 112 is disposed over the internal plate 108 and an internal plate 114 is disposed over the insulation panel 112. In some aspects, both the insulation panel 112 and the internal plate 114 have openings that correspond to the opening in the frame 102.

Figure 10A:
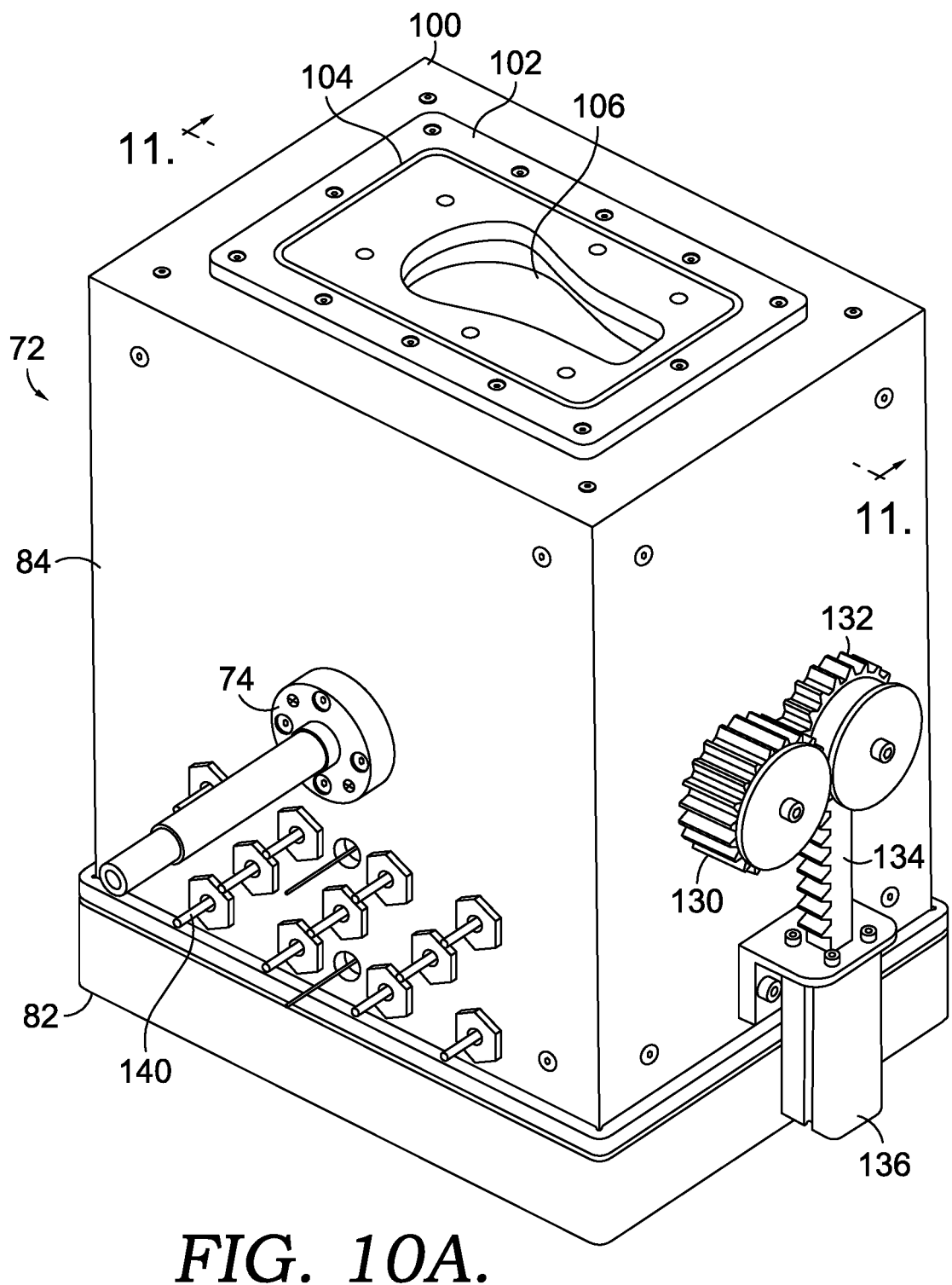
FIG. 10A depicts an enlarged perspective view of the media container, in accordance with aspects hereof.

As best seen in FIG. 11, the interior plates 88, internal cover 94, internal plate 114 and a portion of the membrane 106 from an interior volume within the media container 72. This interior volume is separated into a first chamber 116 and a second chamber 118 by a valve 120. In some aspects, the valve 120 includes a pair of gates 122 (see FIGS. 11 and 12) that are moved in a coordinated fashion. Each gate 122 has a width that is half the width of the interior volume, such that, together, the gates 122 span the width of the interior volume when in a closed position. In the closed position, the gates 122 separate the first chamber 116 from the second chamber 118. Each gate 122 is coupled to a shaft 124 that extends through the media container 72. As best seen in FIG. 11, a valve spacer 126 surrounds the shaft 124 proximate the internal plate 88. The shaft 124 extends through the side of the media container 72 and in some aspects, is rotationally supported by a bushing. In some aspects, the bushings include a bearing to facilitate smooth rotational movement. As seen in FIG. 10A, on the exterior of the media container 72, in some aspects, a first gear 130 is coupled to one of the shafts 124 and a second gear 132 is coupled to the other of the shafts 124. In some aspects, the first gear 130 has teeth that mesh with teeth on the second gear 132, such that rotation of the first gear 130 in one direction effects rotation of the second gear 132 in the second direction. In some aspects, a rack 134 is driven linearly by a compact actuator 136. The rack 134 has teeth that interact with the first gear 130, such that linear motion of the rack 134 effects rotational motion of the first gear 130, and in turn, the second gear 132. The actuator 136 can be any of a number of actuators, such as electric or pneumatic actuators, that effect linear movement of the rack 134. As the actuator 136 moves the rack 134, the first gear 130 rotates in a first direction and causes the second gear 132 to rotate in an opposite direction. As the first gear 130 and the second gear 132 rotate, they in turn cause the respective shaft 124 to which they are coupled to rotate as well, and thus cause the respective gate 122 coupled to the shaft 124 to rotate. The gates 122 form the selectively openable valve 120. In a first position, the gates 122 are horizontally disposed across the interior volume of the media container 72 to separate the first chamber 116 from the second chamber 118. In a second position, the gates 122 are rotated (by the actuator 136, the rack 134, the first gear 130, the second gear 132 and the shafts 124) to a more vertical position, allowing access between the first chamber 116 and the second chamber 118.

In some aspects, as best seen in FIG. 11, a plurality of heating elements 140 are coupled to the media container 72 and extend through and across the interior volume of the first chamber 116 of the media container. In some aspects, the heating elements 140 are cylindrical resistance heating elements. In some aspects, the heating elements 140 are surrounded by a protective cover 142, at least within the interior volume of the first chamber 116. The media container 72 holds a volume of formable media 142 that takes the shape of the media container 72 and that flows in and around the heating elements 140 when the media 142 is in the first chamber 116, (see FIG. 6) and that flows on and around the membrane 106 when the media 142 is in the second chamber 118. In some aspects, the media 142 is sand, but it should be understood that other formable media having thermal retention properties could also be used, such as ceramic microspheres, glass microspheres, corundum or other materials. For clarity, the formable media 142 is not shown in every figure.

As best seen in FIG. 1, in some aspects, the system 10 includes a plurality of guard panels 150 supported by an upper frame 152 that prevent access to the media container 72, and the article container 42 when the article container 42 is in the forward position. As shown in FIG. 1, in some aspects, the system 10 includes a control panel 154. The control panel 154 houses the electronic logic that controls the operation of system 10. In some aspects, this includes controlling the operation of the vacuum tank 28, the linear actuator 34, the actuator 58, the motor 66, the compact actuator 136 and the heating elements 140. The logic within the control panel executes commands to carry out the method described below with respect to FIG. 13.

Figure 6:
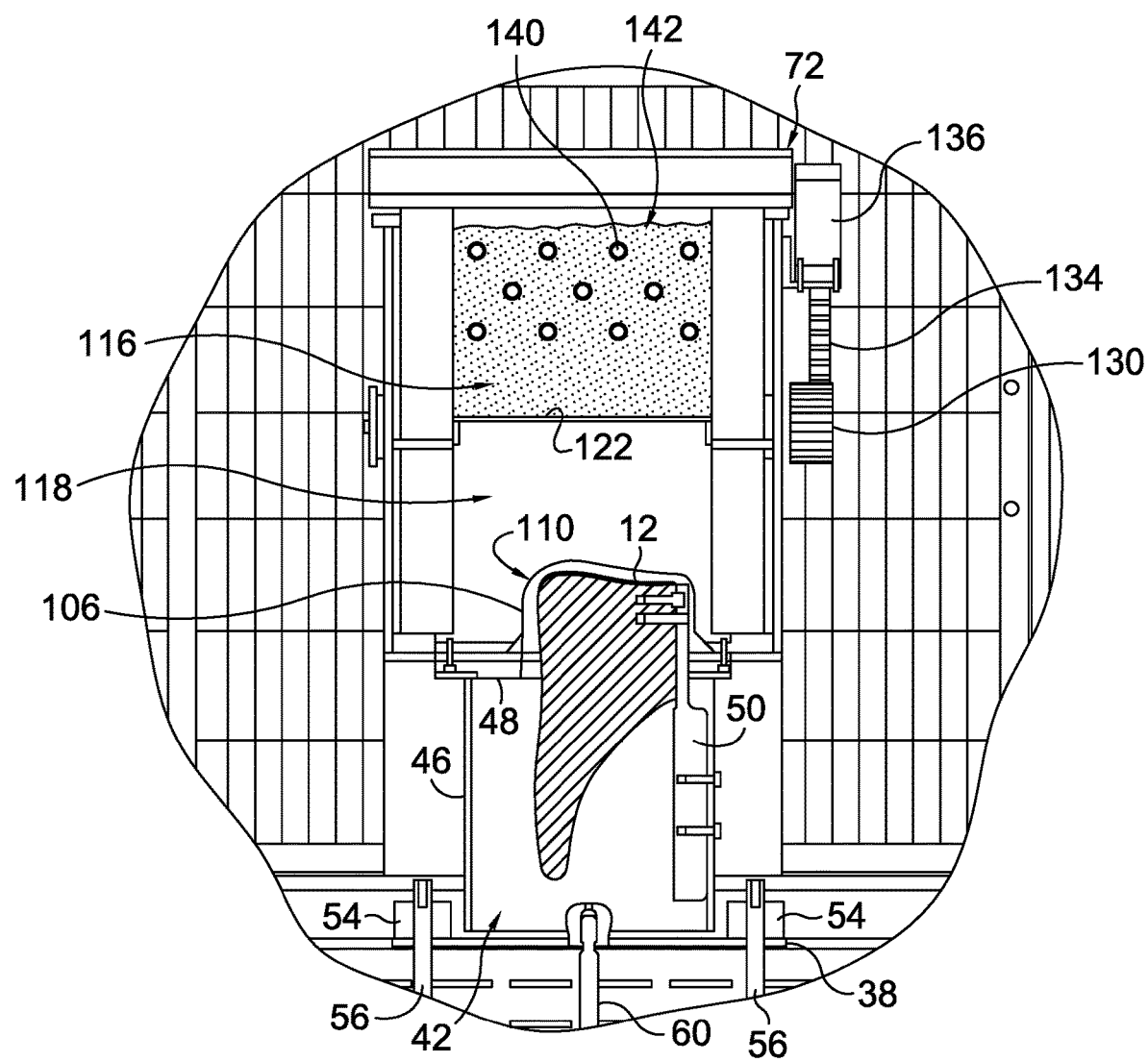
FIG. 6 depicts an enlarged view of the encircled region 6 of FIG. 5, in accordance with aspects hereof.
Figure 7:
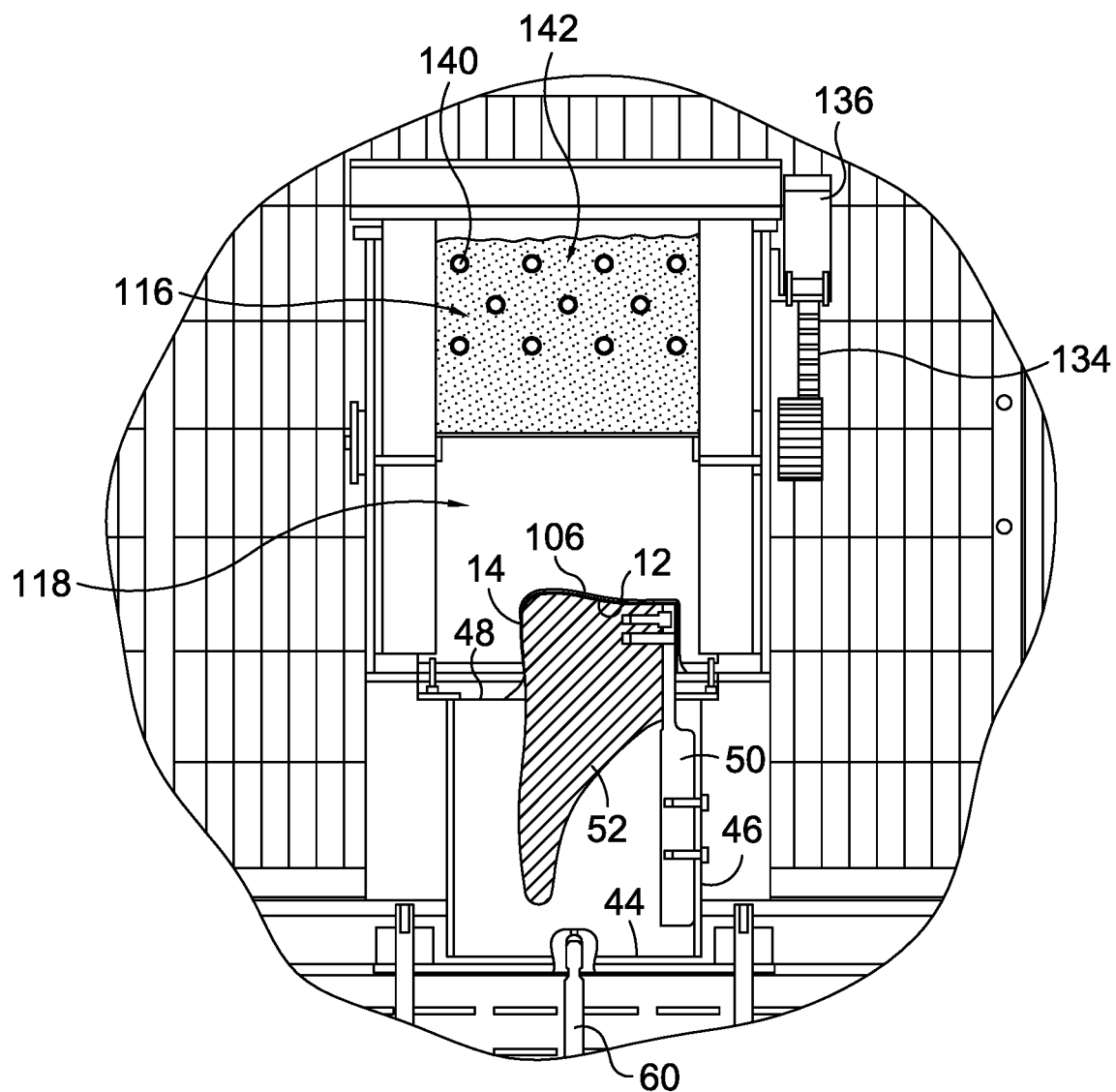
FIG. 7 depicts a view similar to FIG. 6, but with a vacuum applied, in accordance with aspects hereof.
Figure 8:
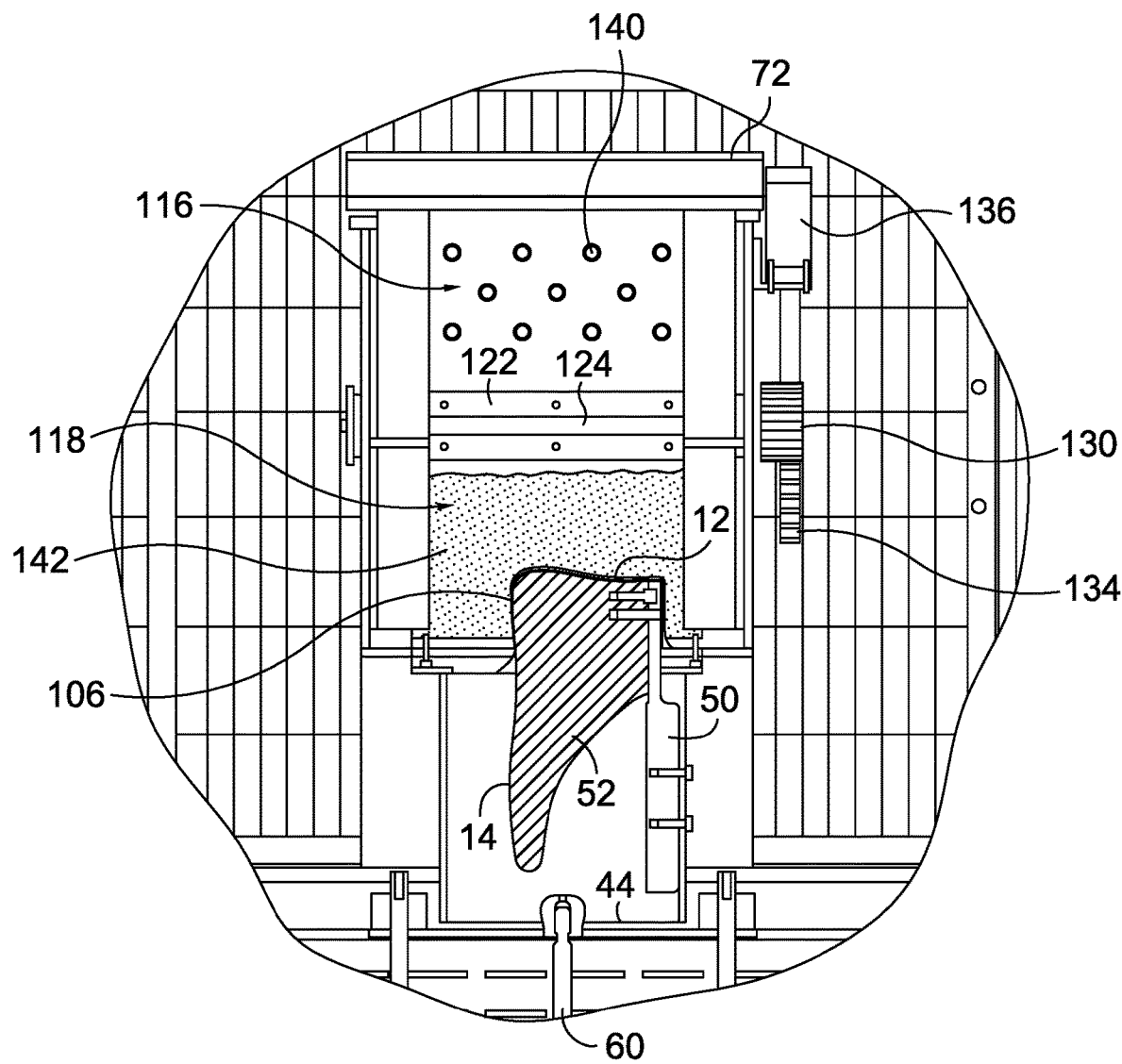
FIG. 8 depicts a view similar to FIG. 7, but with a heated media released from a first chamber to a second chamber, in accordance with aspects hereof.
Figure 9A:
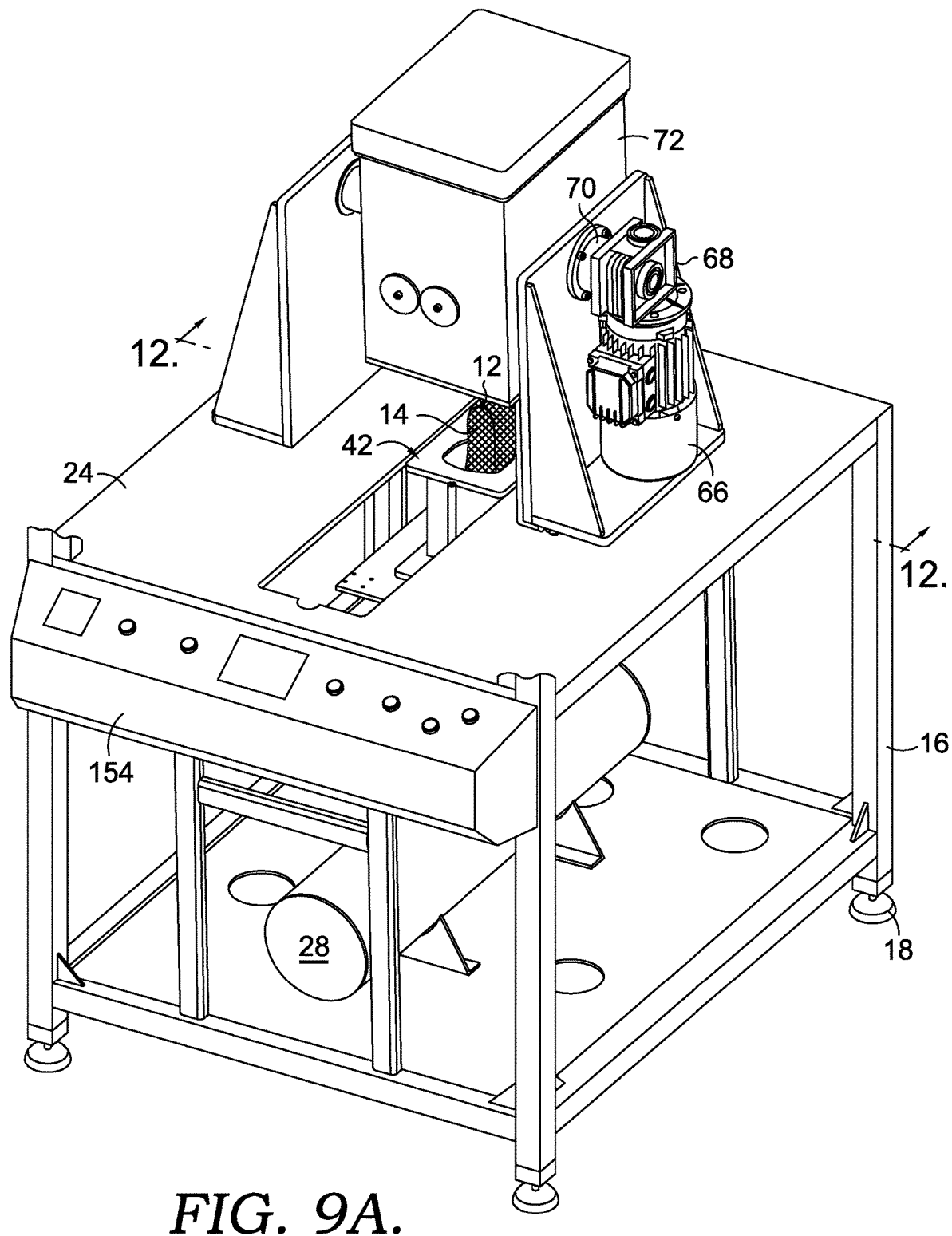
FIG. 9A depicts a perspective view similar to FIG. 2, in accordance with aspects hereof.
Figure 9B:
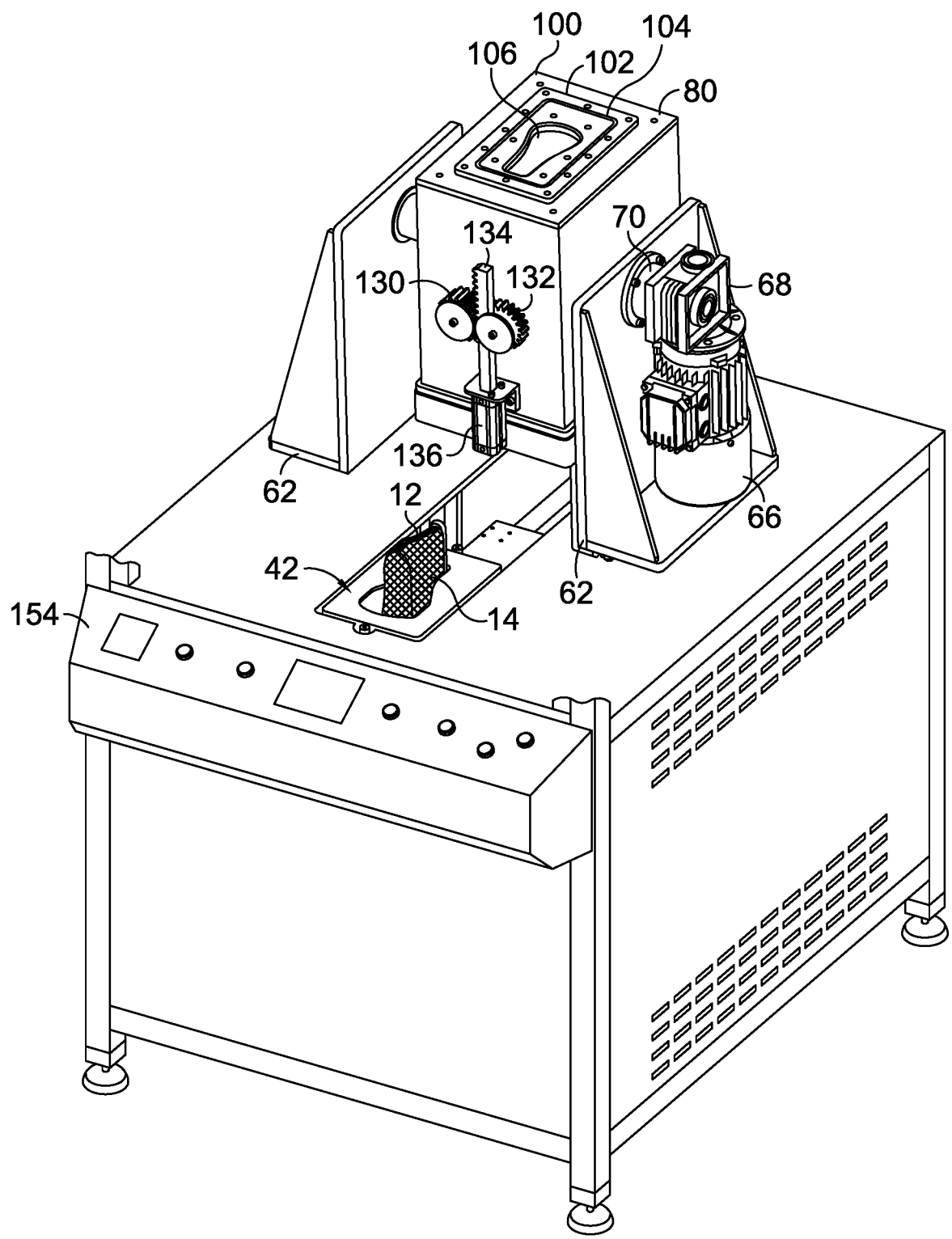
FIG. 9B depicts a perspective view similar to FIG. 9A, but with the article container moved rearwardly and a media container rotated, in accordance with aspects hereof.
Figure 9C:
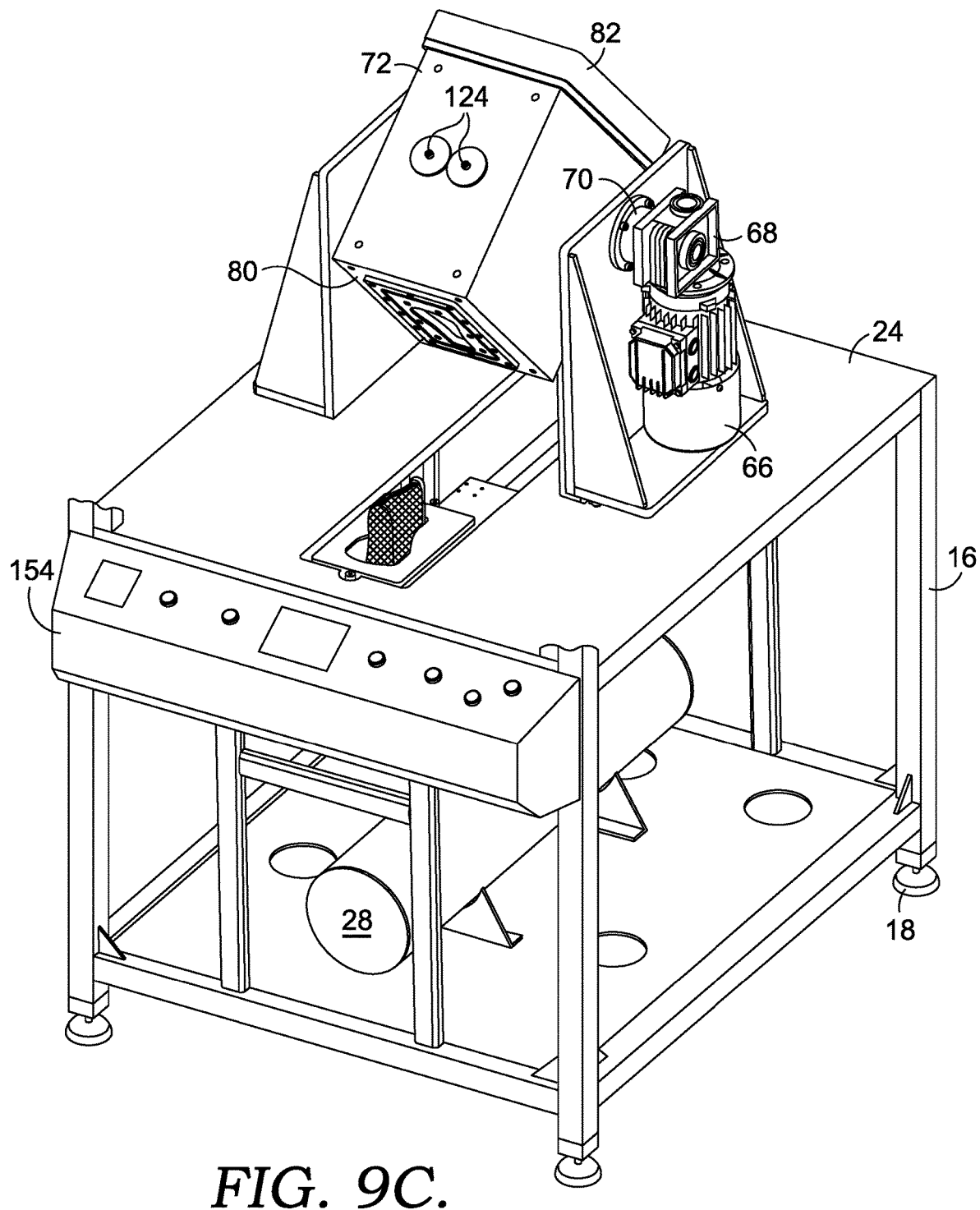
FIG. 9C depicts a perspective view similar to FIG. 9B, but with the media container rotated to another position, in accordance with aspects hereof.
Figure 10B:
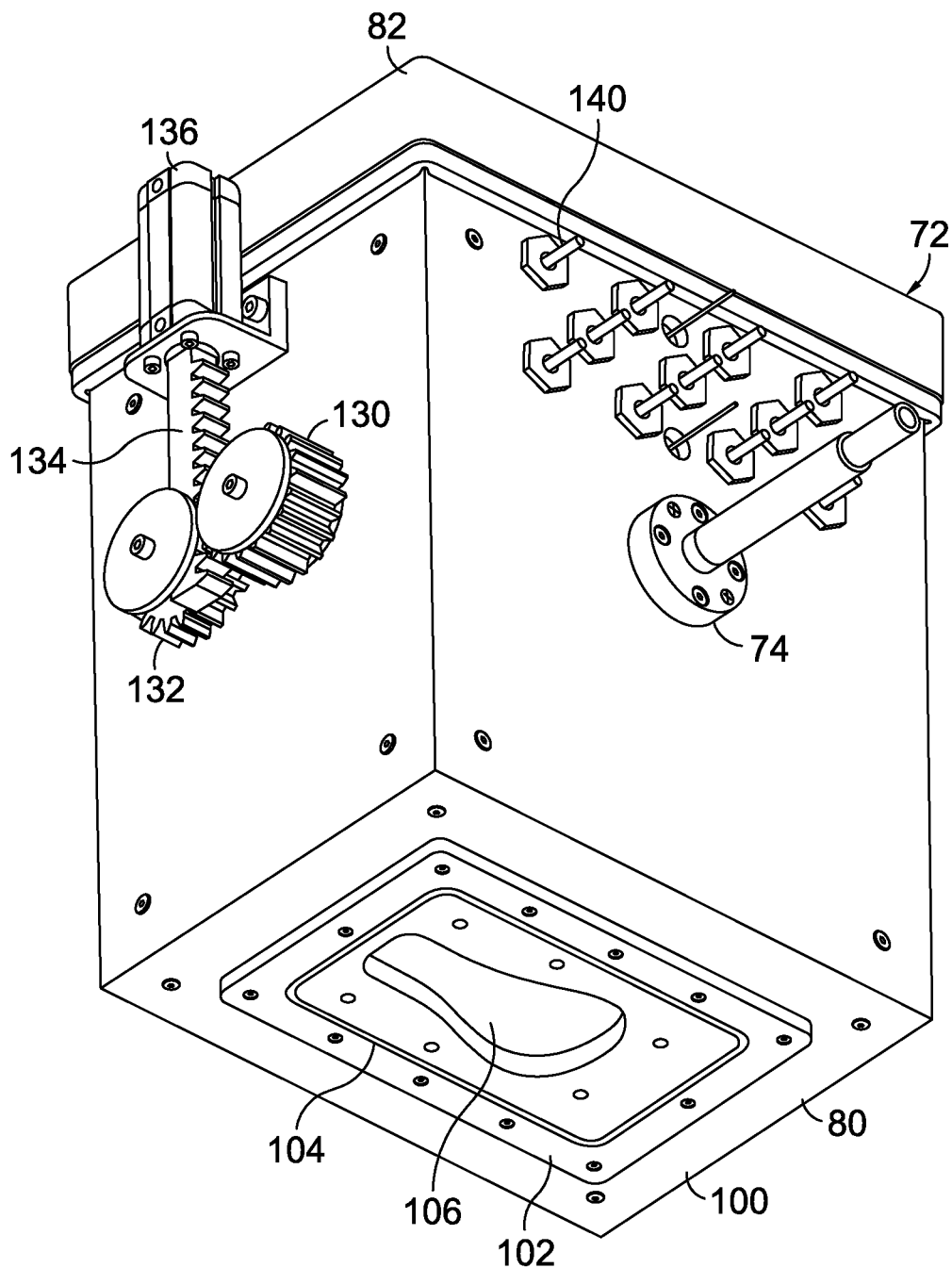
FIG. 10B depicts a view similar to FIG. 10A but with the media container in a different orientation, in accordance with aspects hereof.
Figure 10C:
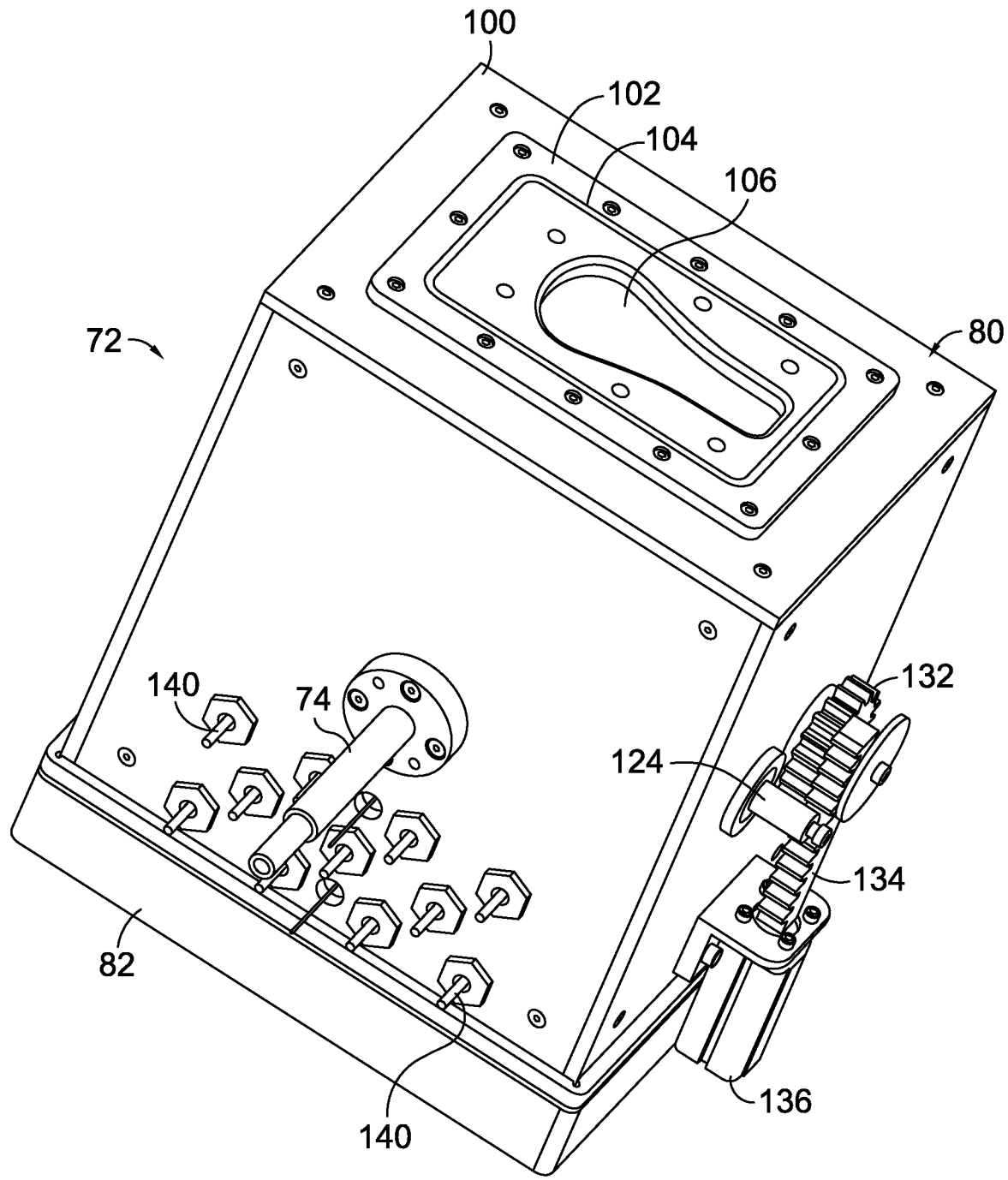
FIG. 10C depicts a view similar to FIG. 10B, but with a rack moved to a position to open internal gates of the media container, in accordance with aspects hereof.

In use, in some aspects, an operator may place the article 14 onto the form 52 (and one or more elements 12 if desired). In some aspects, as shown in method 160 of FIG. 13, the article 14 may be placed on the form 52, as shown at block 162. The operator may place element 12 in the desired location on article 14, either before or after placing the article 14 on the form 52, as shown at block 164. In some aspects, the article 14 is solely placed on the form 52, such as when the system 10 is used to form the shape of article 14 by providing heat to the article 14. With the article container 42 in the loading position, as shown in FIG. 1, the operator may place the form 52 (with the article 14 and/or element(s) 12 in place) onto the bracket 50 within article container 42, as shown at block 166. The article 14, element 12 and the form 52 are shown in place on bracket 50 in the loading position in FIGS. 1A and 1B. In this position, the formable media 142 is in the first chamber 116 of the media container 72. While in the first chamber 116, the formable media 142 is heated to a desired temperature by the heating elements 140. In some aspects, the formable media 142 is heated to a range of between 230-250 degrees Celsius. It should be understood that the temperature range is dependent upon the formable media 142 as well as the materials to be thermoformed or attached (such as the article 14 and any elements 12). Once loaded in the article container 42, the linear actuator 34 may be engaged to move the vacuum slide plate 38 and article container 42 forward along linear guides 42 to the forward position as shown in FIGS. 2 and 3. With article container 42 in the forward position, the motor 66 is used to rotate the media container 72 such that the first chamber 116 is directly above the second chamber 118 as shown in FIGS. 2 and 6, for example. The media container 72 can be rotated to this position either before, during or after article container 42 is moved to the forward position as shown in FIG. 2. FIG. 10B shows the media container 72 in isolation in this position. In this position, the form 52 (with the article 14 and/or element 12) is in vertical alignment with the interior portion 110 of membrane 106. Once aligned, the linear actuator 58 acts as an engagement mechanism and moves rod 60 and raises the base 44 and thus the article container 42, guided by bushings 54 along columns 56. The linear actuator 58 (engagement mechanism) raises the article container 42 into engagement with the media container 72, as shown at block 168, and as seen in FIGS. 4 and 5. In some aspects, the gasket 104 on media container 72 forms an airtight seal with the lid 48 of the article container 42. In this position, the vacuum tank 28 pulls a negative pressure within the volume within the tank 46 of article container 42, sealed with the gasket 104 and the membrane 106, as shown at block 170. In some aspects, the vacuum tank 28 pulls a negative pressure, and in some aspects the vacuum tank effects a pressure of negative 1 (−1) bar. This negative pressure pulls the membrane 106 against the form 52, with the article 14 and/or element 12 between the form 52 and the membrane 106. FIG. 6 shows the membrane 106 spaced from the form 52, the article 14 and the element 12 before a vacuum is applied by the vacuum tank 28. FIG. 7 shows the membrane 106 pulled tight and sandwiching the article 14 and the element 12 between the form 52 and the membrane 106. With the vacuum applied, the actuator 136 is engaged to move the rack 134 to the position shown in FIG. 8 and thus rotating the first gear 130 and the second gear 132. This rotation in turn rotates the gates 122, allowing the heated, formable media 142 to flow from the first chamber 116 to the second chamber 118 as shown in FIG. 8. The formable media 142 surrounds the membrane 106 and thus the article 14 and element 12, as shown at block 172. The heat from the formable media 142 is transferred through the membrane 106 and to the article 14 and/or the element 12 thus activating any thermo-adhesives on the article 14 and/or element 12, or to form the article 14 into a desired shape. In certain aspects, the heated formable media 142 transfer heat over time to the article 14 and/or element 12 sufficient to cause at least a portion of a material of the article 14 and/or the element 12 to melt and/or deform. In some aspects, the heated formable media 142 is left in position over the membrane 106 for a period of between ten and forty seconds, or for a time period of between twenty and thirty seconds. In some aspects, a time period of twenty-five seconds is used. In some aspects, the heating elements 140 initially heat the formable media 142 to a temperature range of between 150° C. to about 350° C., or about 200° C. to about 300° C., or about 230° C. to about 250° C. In some aspects, thermo-couples may be used to determine a desired temperature range for deformable media 142. In addition, the duration of exposure of the article 14 and element 12 to the heated formable media 142 may be adjusted to obtain a proper bonding or attaching of the article 14 and the element 12. After the desired time delay, the vacuum tank 28 releases the negative pressure and the actuator 58 is used to lower the article container 42 as shown in FIG. 9A. The actuator 34 is used to return the article container 42 from the forward position to the loading position as shown in FIG. 9B, and the operator may remove the form 52 and the now-coupled article 14 and element 12. At this point, the article 14 is formed into the desired shape or the article 14 and element 12 are bonded, thermo-coupled or attached to one another. To ready system 10 for an additional cycle, the motor 66 is used to rotate the media container 72 so that the first chamber 116 is below the second chamber 118 as shown in FIG. 9B (FIG. 10A shows the media container 72 in isolation in this position). At this point, the gates 122 are still rotated to an open position, allowing the formable media 142 to flow from the second chamber 118 back into the first chamber 116. After a time delay allowing the formable media 142 to flow from the second chamber 118 to the first chamber 116, the actuator 136 is engaged to move the rack 134, rotating the first gear 130 and the second gear 132, to close the gates 122. In some aspects, the motor 66 rotates the media container 72 past vertical (as shown in FIG. 9C and FIG. 10C) and then back to vertical (FIG. 9A and FIG. 10B), to better distribute and level the formable media 142 within the media container 72.

It should be understood that any number of articles 14 may be shaped, and/or articles 14 and elements 12 may be attached by system 10, and that the article 14 and the element 12 are shown as examples within the Figures, but that other components, shapes and sizes of both article 14 and element 12 are contemplated. Moreover, while the system 10 is depicted as a stand-alone system, a larger system, with multiple article containers 42 and media container 72 may be used and integrated into a larger automated system, such as a rotary system where different article containers 42 are loaded at different times.

In one aspect, the article 14 and/or the element 12 can include a material, or a layer, that may fuse with corresponding portions throughout the attaching process. In such an aspect, the element 12, the article 14 and/or a layer thereof, can include a thermoplastic material that has a melting temperature, a Vicat softening temperature, a heat deflection temperature, or any combination thereof, in the range of about 80° C. to about 135° C., or from about 90° C. to about 120° C. The melting temperature can be determined according to the test method detailed in ASTM D7138-16. The Vicat softening temperature can be determined according to the test method detailed in ASTM D1525-09, preferably using Load A and Rate A. The heat deflection temperature can be determined according to the test method detailed in ASTM D648-16, using a 0.455 MPa applied stress.

In aspects, the article 14 can be a component of an article of footwear, such as an upper. The upper can include a woven, braided, knit, or non-woven textile. In aspects, such a textile may include one or more yarns or fibers comprising a yarn or fiber composition that includes a thermoplastic material. In such aspects, the thermoplastic material and/or the yarn or fiber composition can exhibit a melting temperature (or melting point), Vicat softening temperature, heat deflection temperature, or a combination thereof, that is from about 80° C. to about 135° C., or from about 90° C. to about 120° C. In one aspect, the thermoplastic material and/or the yarn or fiber composition can exhibit a melting temperature, Vicat softening temperature, heat deflection temperature, or a combination thereof, that is about 135° C. or less, about 125° C. or less, or about 120° C. or less. In the same or alternative aspects, the article 14 can include one or more materials that will not melt or deform under the processing conditions disclosed herein. In such an aspect, in the case of such a thermoplastic material, such material can exhibit a melting temperature greater than about 135° C., greater than about 140° C., or greater than about 150° C. Further, in such aspects, another material that may be present in the article, such as a material other than a thermoplastic material, may not degrade below a temperature of about 150° C., about 140° C., or about 135° C.

Using the system 10 and the method 160, the element 12 can be attached to the article 14 without the need for high temperature heat lamps. The heat lamps may limit the types of applications, materials and components that may be coupled together. Moreover, the system 10 and method 160 may reduce the labor required to efficiently couple elements 12 to articles 14. It has also been found that the system 10 and the method 160 result in a higher consistency of bonding quality and performance.

Figure 13:
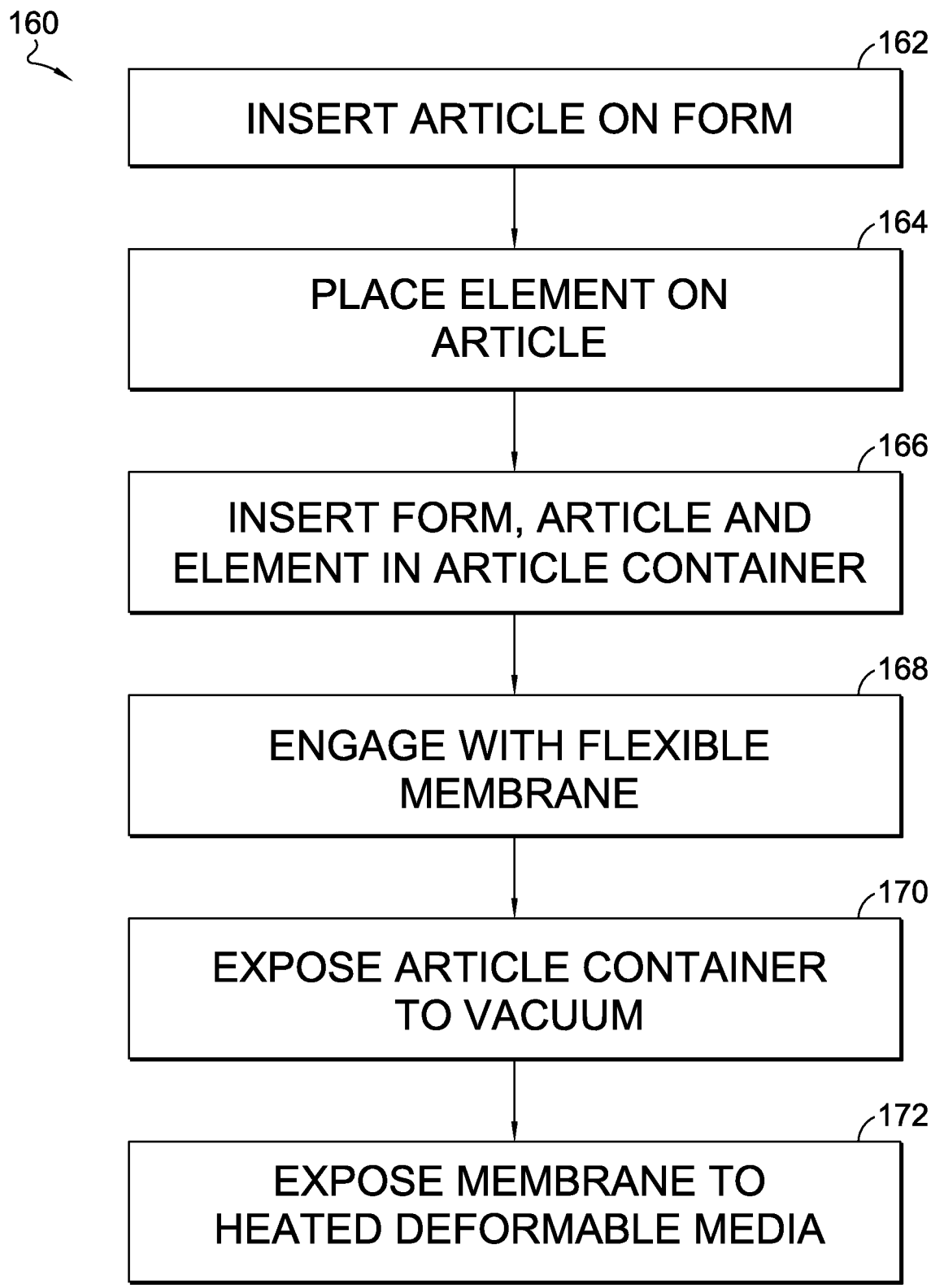
FIG. 13 is a flow diagram of a method of attaching an article to an element, in accordance with aspects hereof.

While specific reference in FIG. 13 is made to one or more steps, it is contemplated that one or more additional or alternative steps may be implemented while achieving aspects provided herein. As such, blocks may be added or omitted while still staying within the scope hereof.

Figure 21:
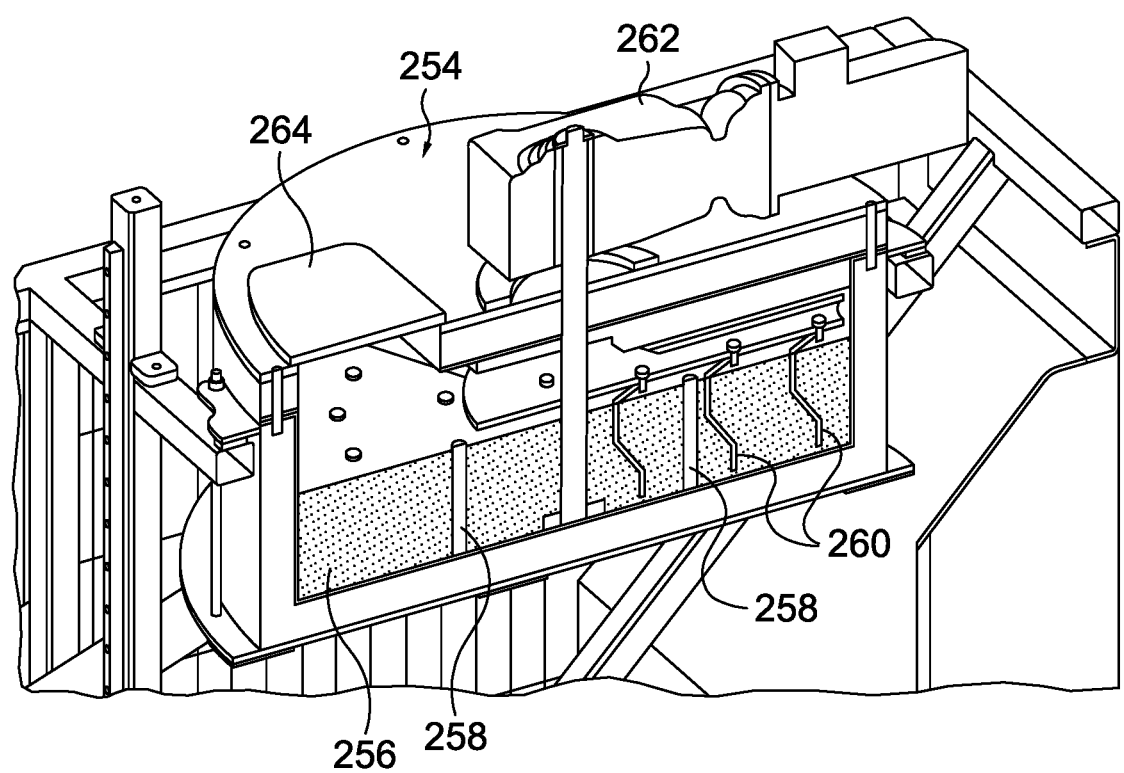
FIG. 21 is an enlarged view of the encircled region 21 in FIG. 15.
Figure 22:
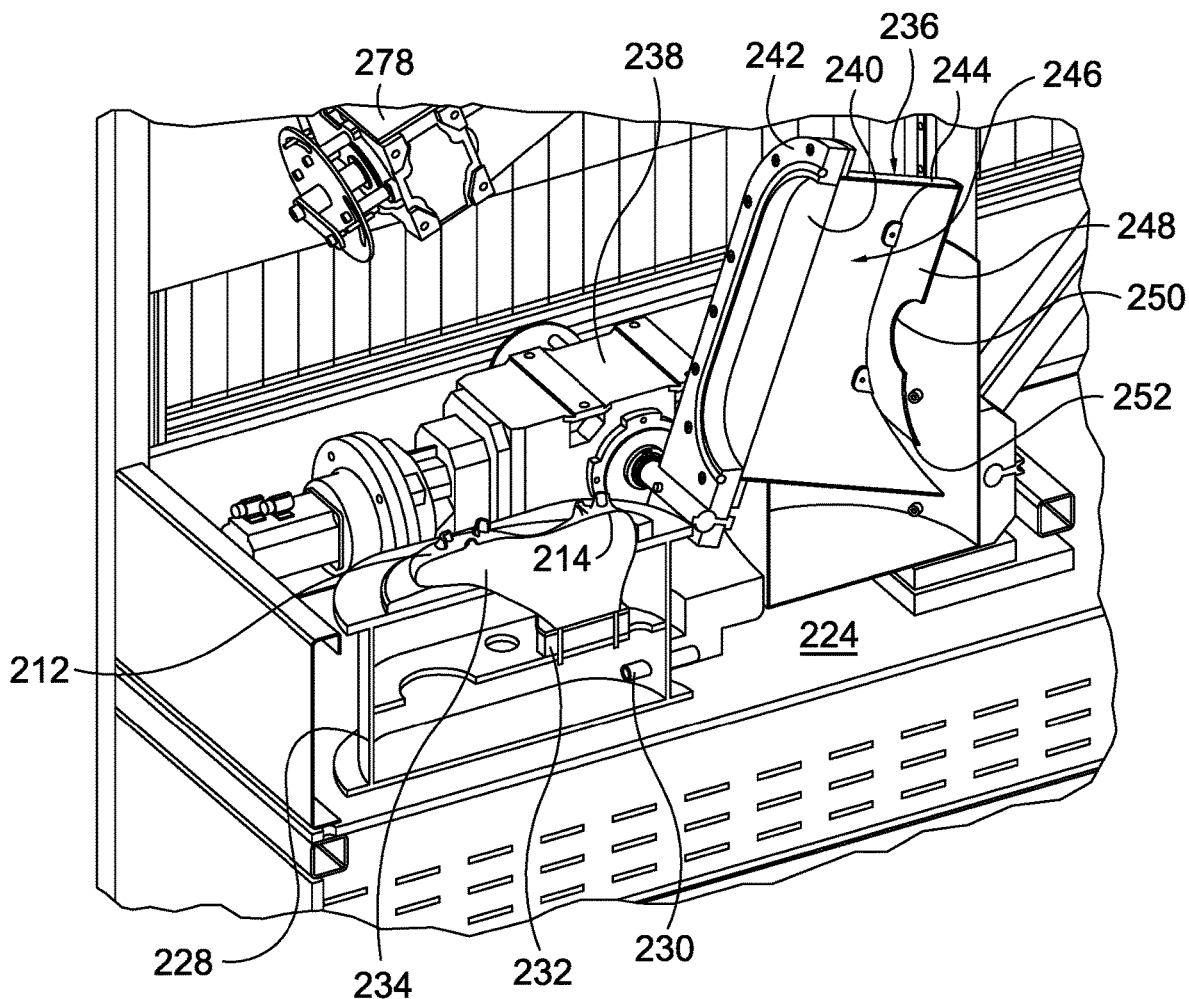
FIG. 22 is an enlarged view of the encircled region 22 in FIG. 15.
Figure 23:
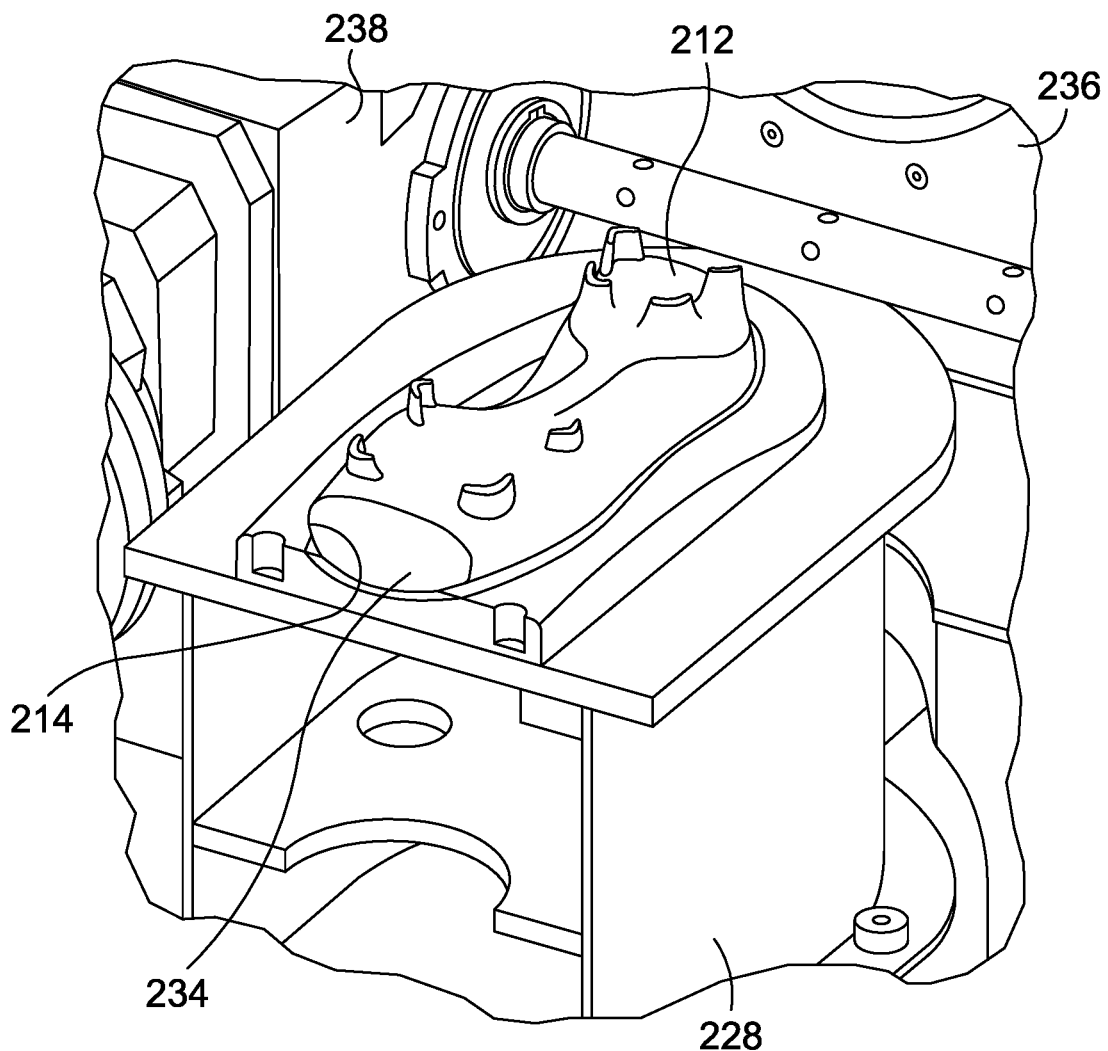
FIG. 23 is an enlarged view of the article and element in place within the article container.

FIGS. 14-25 depict another aspect of a system 200 for providing heat to an article 214 (as seen in FIG. 23). In some aspects, the system 200, like the system 10, can be used to thermo-couple or attach an element 212 to an article 214 (as best seen in FIG. 23). In some aspects, the article 214 is a portion of an article of footwear, such as an outsole. It should be understood, that while the system 200 depicts the article 214 as a portion of an article of footwear, e.g., a sole assembly or an outsole, other types of articles or other portions of an article of footwear can be utilized in the system 200 described herein. In some aspects, the article 214 may be constructed from thermo-fuse-able materials, having a desired melting temperature. In some aspects, the element 212 is an accompanying part of an article of footwear, and in some aspects is a cleat plate. It should be understood that element 212 could be any of a number of different elements coupled to the article 214, e.g. a midsole, an outsole, aesthetic embellishments, a toe support, a foxing strip or other footwear elements. In some aspects, the article 214 and/or the element 212 are of a thermoformable or thermoplastic material, or have a layer of thermoformable or thermally activated material thereon, that, when heated, forms the article 214 into a desired three-dimensional shape and/or bonds or attaches the article 214 and the element 212 to one another.

Figure 15:
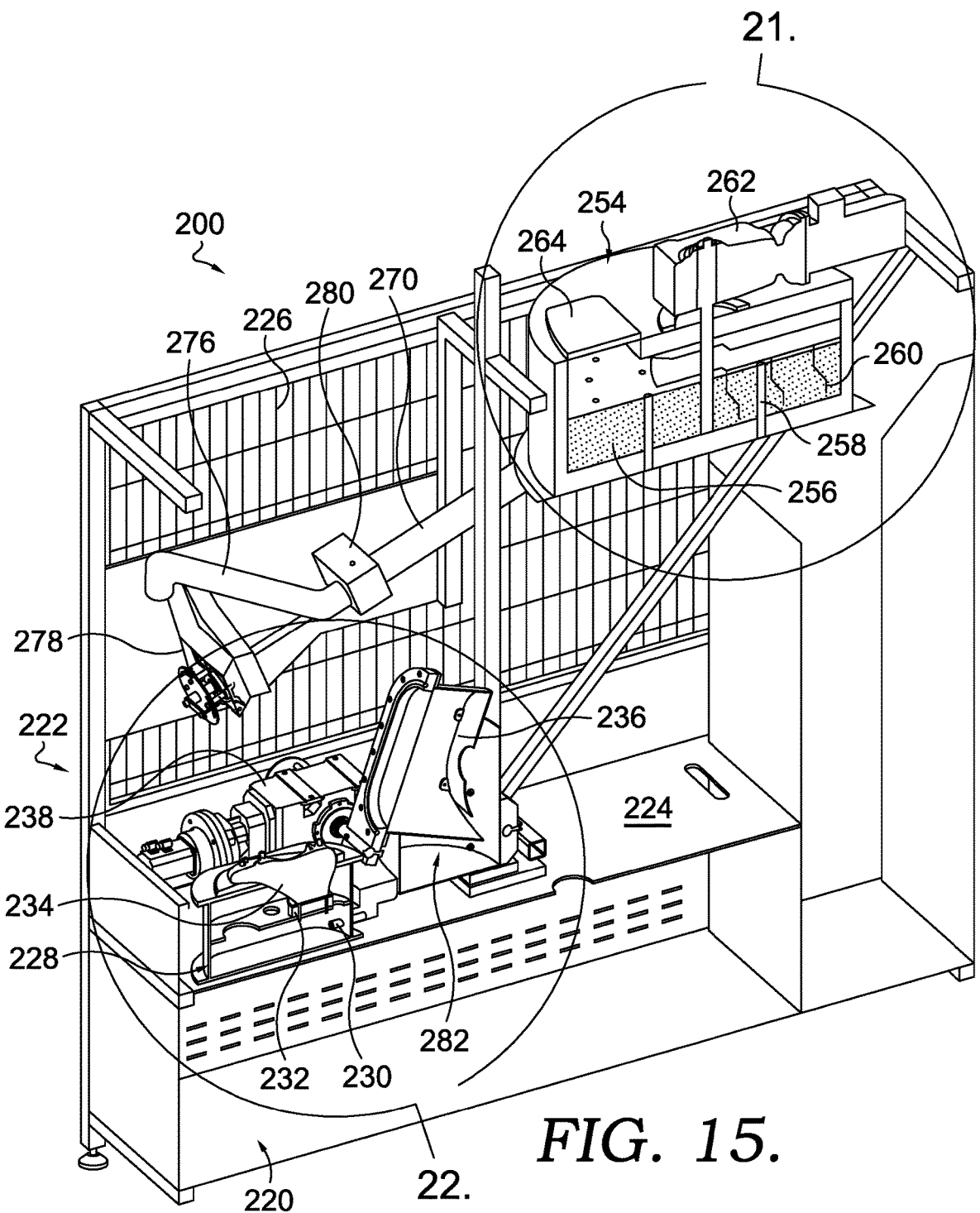
FIG. 15 is a cross-sectional view of the system of FIG. 14, shown with the media container in an unloading position.

In some aspects, the system 200 has an outer supportive frame 216. In some aspects, the frame 216 is made from square metal tubing, but could also be any of a number of rigid materials. The frame 216 can be supported on a surface with a plurality of feet 218. As best seen in FIG. 15, the frame includes a lower portion 220 and an upper portion 222, separated by a plate 224. The lower portion 220 houses a vacuum tank (not shown). The frame 216, in some aspects, can be enclosed with outer guard panels 226 to prevent access to the internal components of the system 200. In the figures, some of the guard panels 226 are not shown to more clearly depict other aspects of the system 200.

As best seen in FIGS. 15 and 22, the plate 224 supports an article container 228 that is in fluid communication with the vacuum tank, such as through a port 230. In some aspects, the article container 228 includes a jig 232 that supports a form 234 onto which the article 214 and element 212 may be held. In some aspects, the jig 232 and the form 234 are integrally formed. In other aspects, the sub-assembly of the form 234, the article 214 and the element 212 are loaded onto the jig 232 in the article container 228 by an operator (shown schematically in FIG. 14).

Figure 16:
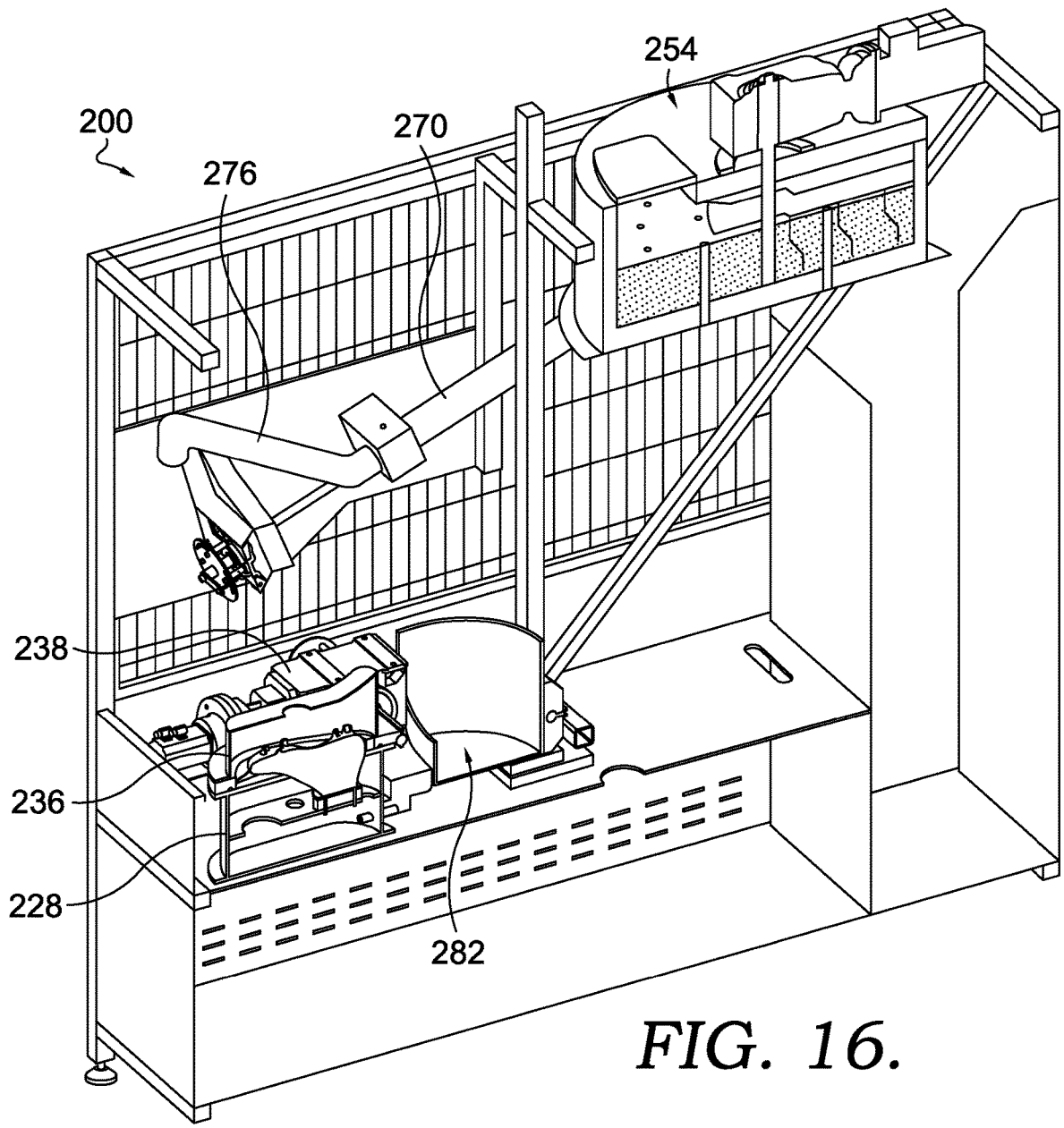
FIG. 16 is a view similar to FIG. 15, shown with the media container in position over the article container.
Figure 18:
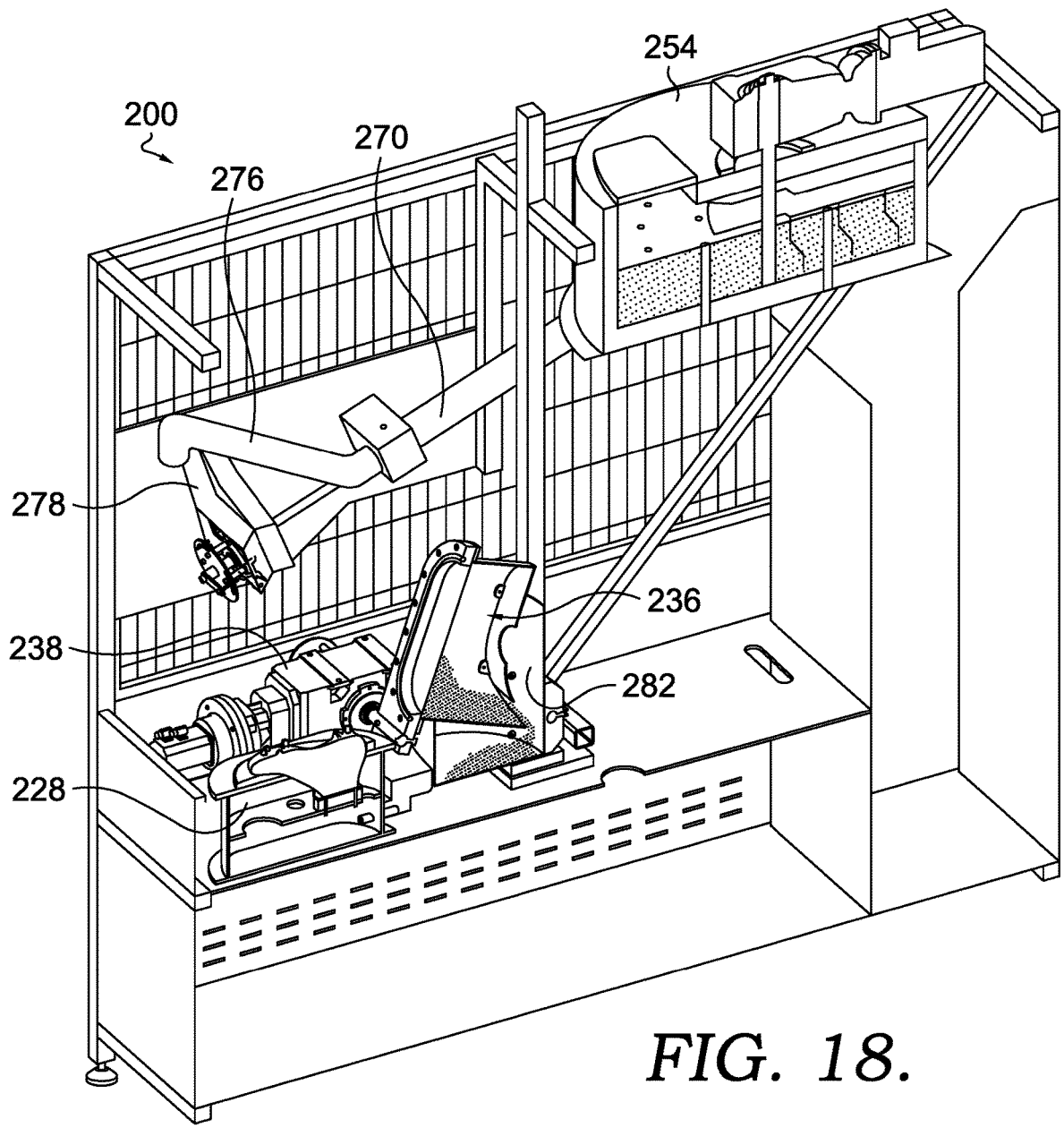
FIG. 18 is a view similar to FIG. 15, showing the media being transferred from the media container to the return bucket.

As best seen in FIG. 22, a media container 236 is coupled to a motor 238 that is operable to move the media container 228 from an unloading position (as shown in FIGS. 18 and 22) to a heating position (shown in FIG. 16, for example). The media container 236 includes a flexible membrane 240 held in place within a lower frame 242 of the media container 236. The media container further includes a perimeter wall 244 that extends away from the frame 242 and the membrane 240. The perimeter wall 244 defines a chamber 246 above the membrane 240. In some aspects, the media container further includes a top 248 coupled to the wall 244. The top 248 may have a first opening 250 and a second opening 252 (partially shown in FIG. 22).

Figure 14:
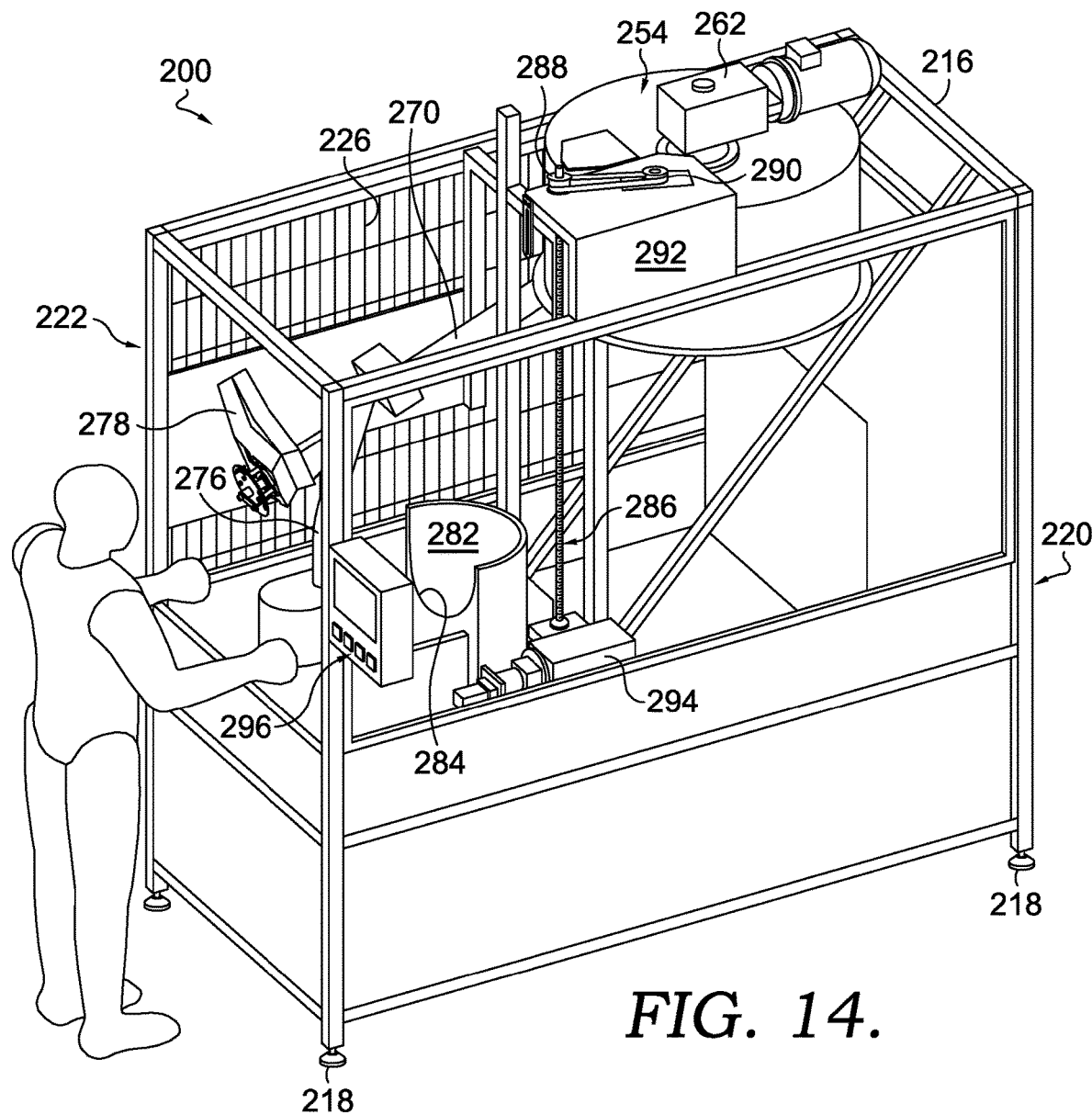
FIG. 14 is a perspective view of another aspect of a system for providing heat to an article, in accordance with aspects hereof.
Figure 24:
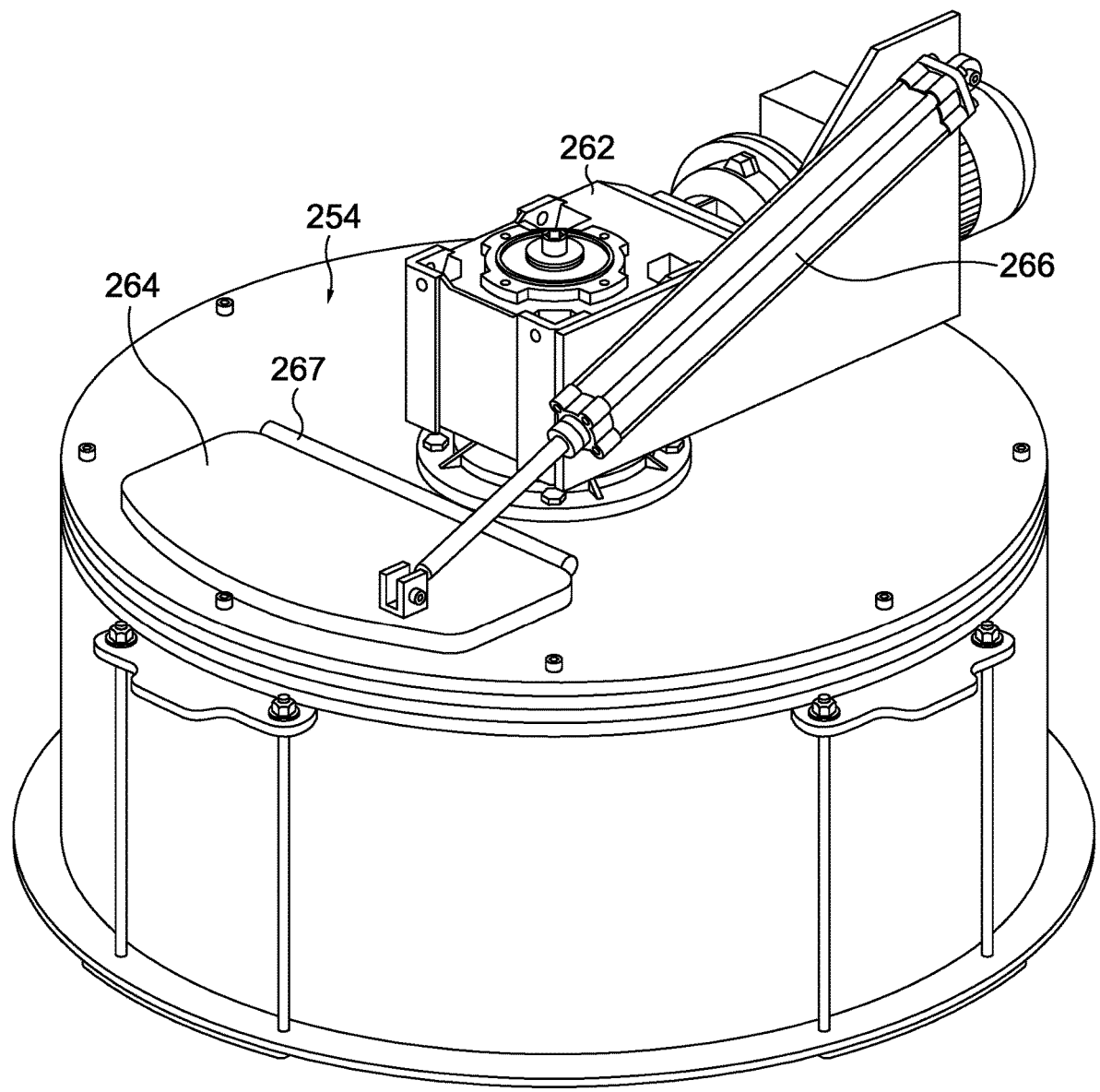
FIG. 24 is an enlarged view of the heated media chamber, showing the access door and piston.

The system 200 further includes a heated media chamber 254 that is supported on the frame 216. In some aspects, the chamber 254 is supported higher on the frame 216 than the media container 236. As shown in FIG. 14, in some aspects the chamber 254 is circular in shape, but other shapes and sizes of the chamber 254 are contemplated herein. As best seen in FIG. 21, the media chamber 254 holds a volume of formable media 256. In some aspects, the media 256 is sand, but it should be understood that other formable media having thermal retention properties could also be used, such as ceramic microspheres, glass microspheres, corundum or other materials. The media chamber 254, in some aspects, includes a number of heating elements 258 spaced throughout the media chamber 254. In some aspects, the heating elements 258 are resistors that heat the formable media 256 to a constant temperature. Other methods of heating the formable media 256 within the chamber 254 could also be used. In some aspects, a number of blades 260 extend into the media chamber 254 which are coupled to a motor 262. The motor 262 provides power to rotate the blades 260. As the blades rotate, the formable media 256 is redistributed within the chamber 254 to mix the formable media 256 in and around the heating elements 258 to provide the formable media 256 with a more uniform temperature distribution. Other aspects of moving the formable media 256 within the chamber 254 are also contemplated, such as rotating an internal volume within the chamber 254, or rotating an arm about the central shaft of the motor 262. As best seen in FIG. 24, the chamber 254 includes an access door 264 that is movably coupled to the top of the chamber 254. The access door 264 is operably coupled to a piston 266. In a first position, the access door 264 is closed, shown, for example, in FIG. 15. In a second position, the access door 264 is pivoted open by the piston 266 about a hinge 267. The piston 266 is operable to move the access door 264 from the first, closed position to the second, open position, to allow access to the internal cavity of the media chamber 254.

Figure 17:
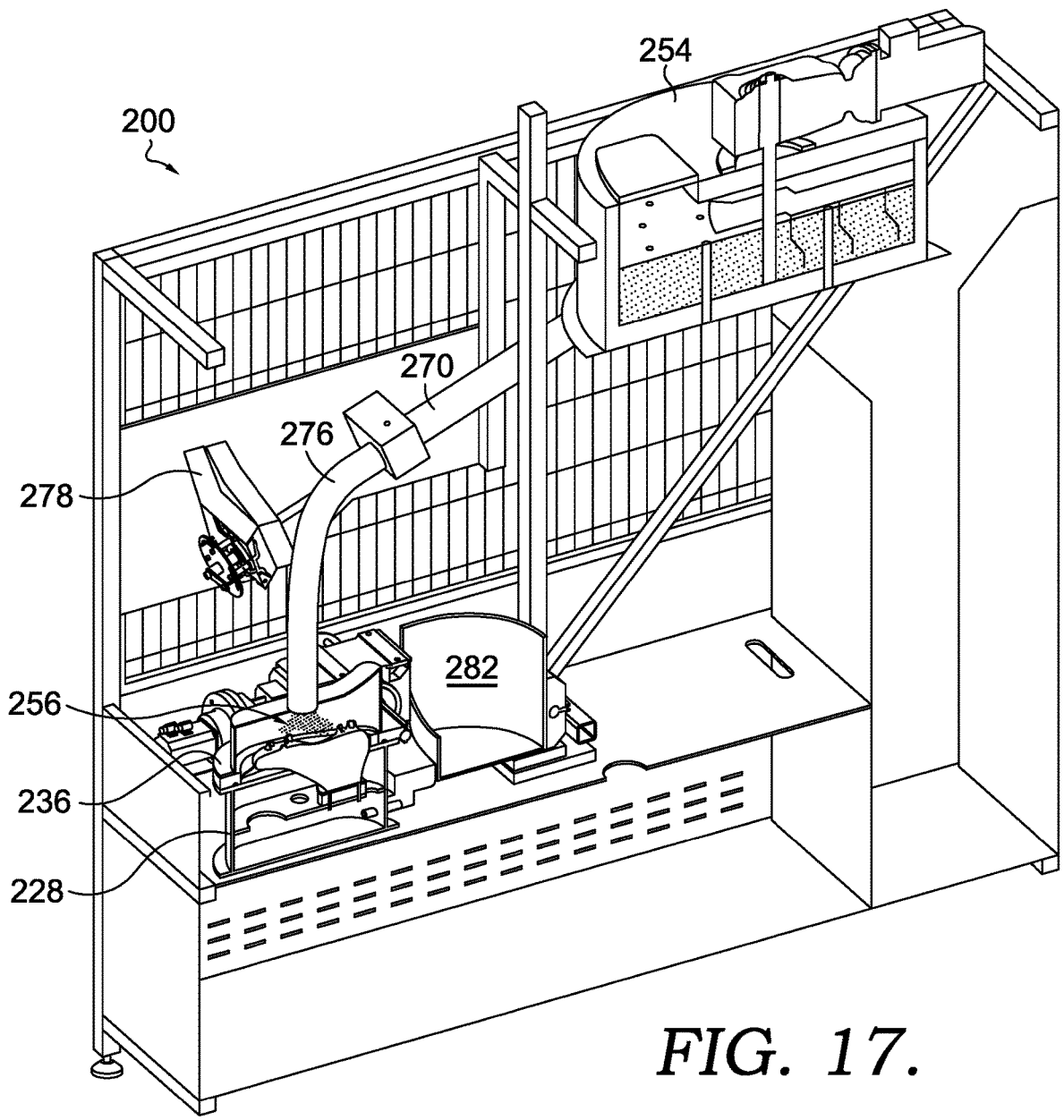
FIG. 17 is a view similar to FIG. 16, shown with the duct delivering hot media to the media container.
Figure 25:
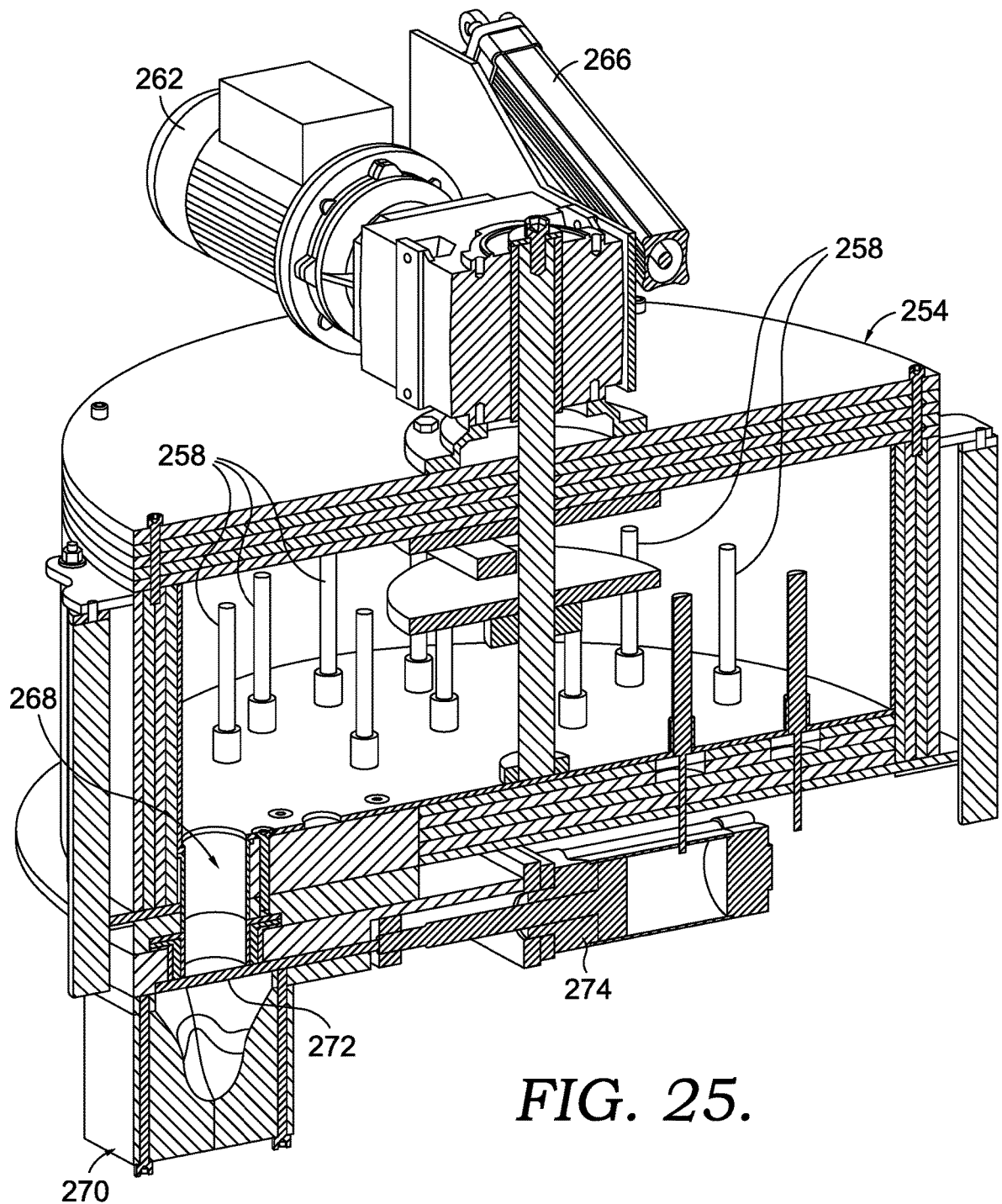
FIG. 25 is a cross-sectional view of the heated media chamber.

As best seen in FIG. 25, the media chamber 254 also includes an exit port 268 in the bottom of the media chamber 254. In some aspects, the exit port 268 is a cylindrical opening that is connected to a hot sand duct 270. The exit port allows the formable media 256 in chamber 254 to flow into the hot sand duct 270. Access from the chamber 254 to the hot sand duct 270 is controlled by a door 272. The door 272 is coupled to a piston 274. The piston 274 is operable to position the door 272 to a closed position covering the exit port 268, or to an open position away from the exit port 268. In the open position, the formable media 256 in chamber 254 can flow (via gravitational forces) into the hot sand duct 270. As best seen in FIG. 15, the hot sand duct 270 is coupled to an exit duct 276. In some aspects, the exit duct 276 is pivotable between a stowed position, as seen in FIG. 14, for example, and a loading position, as seen in FIG. 17, for example, via a motor 278 and junction box 280. In some aspects, the motor 278 is held in place and supported on the frame 216.

Figure 19:
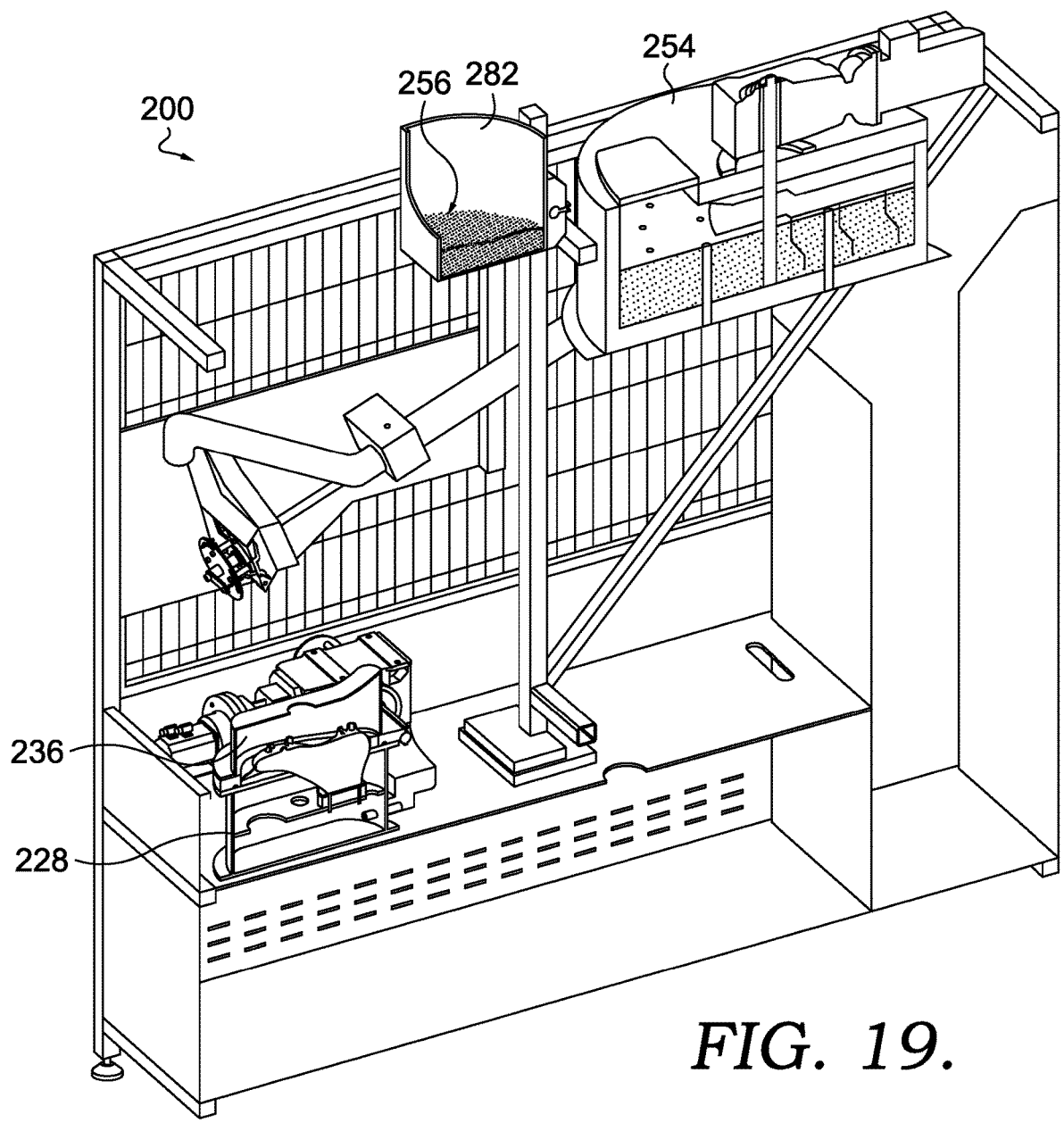
FIG. 19 is a view similar to FIG. 18, shown with the return bucket in the raised position.

The system 200, in some aspects, further includes a return bucket 282, as best seen in FIG. 14. The return bucket 282 may have a front wall 284 having a u-shaped opening formed therein. The return bucket 282 is supported on a platform having a rack gear (not shown) that mates with an elongated worm gear 286. The worm gear 286 extends from the plate 224 and upward to a driven gear or pulley 288. The driven gear 288 is coupled to a drive gear 290 which is driven by a motor (not shown) within a housing 292. As the motor drives gear 290 and gear 288, the worm gear 286 rotates and interacts with the rack to selectively move the platform and the return bucket 282 from a lower position (as shown in FIG. 18, for example) to a raised position (as shown in FIG. 19, for example). The return bucket 282 is also coupled to a dump motor 294, as seen in FIG. 14. The dump motor 294 is operable to move the return bucket from the loaded position shown in FIG. 19, for example, to the unloading position shown in FIG. 20, for example. As seen in FIG. 14, the operation of the system 200 may be controlled at an operator station 296 that controls the operation and sequencing of the various motors and pistons described above.

In use, an operator may load the article 214 and the element 212 within the system 200, such as by placing the article 214 and the element 212 in place on the form 234 and/or the jig 232. In this initial step, the media container 236 is pivoted to the open position by motor 238 to allow access to the jig 232. Also in this initial step, the door 276 is positioned over the exit port 268, the exit duct 276 is in the stowed position and the return bucket 282 is in the lowered position.

Figure 20:
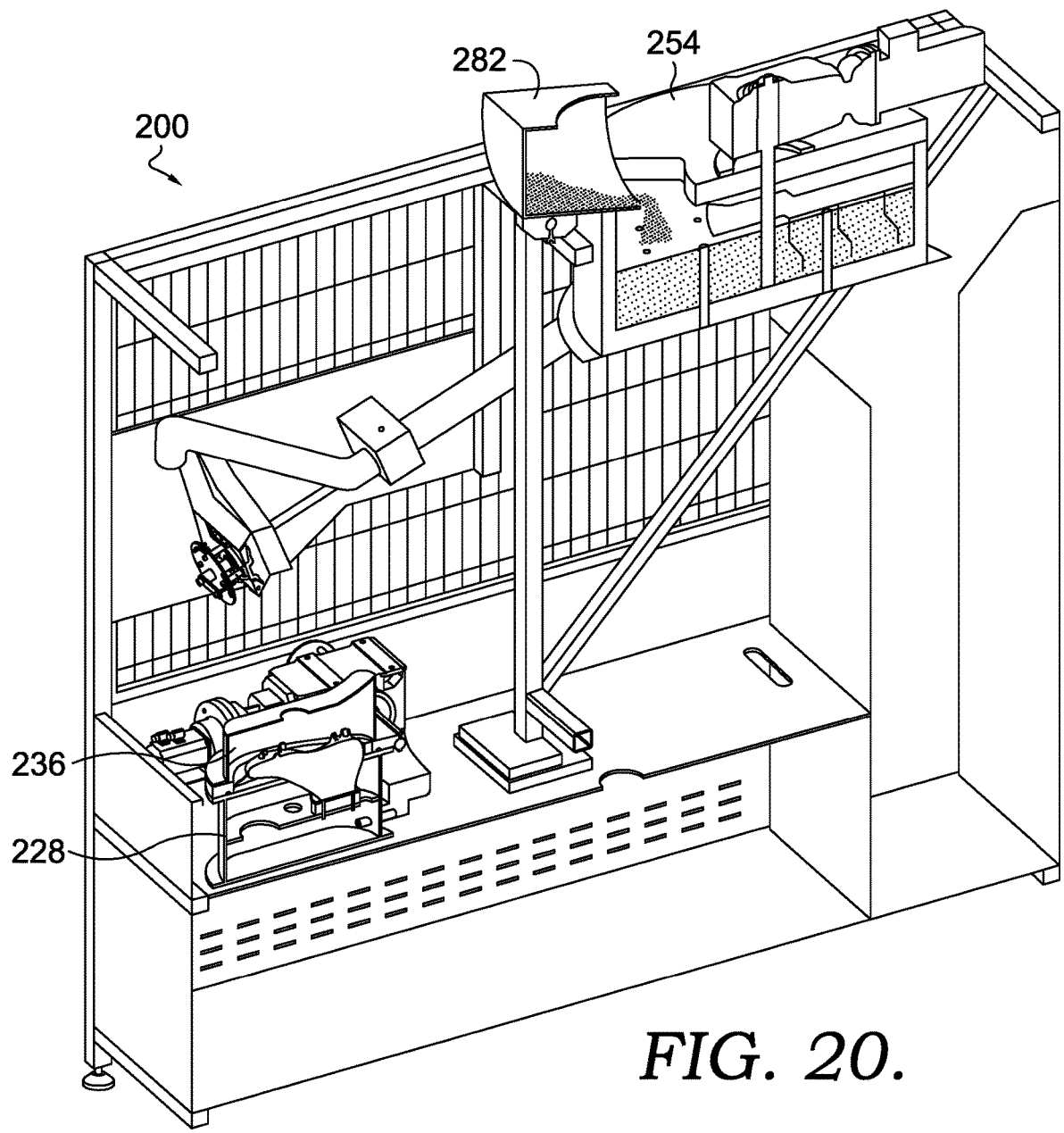
FIG. 20 is a view similar to FIG. 19, shown with the return bucket pivoted to deliver media to the heated media chamber.

With the article 214 and element 212 in place (such as is shown in FIG. 23), the media container 236 is pivoted into the lowered position by motor 238, as shown in FIG. 16. In this position, the membrane 240 deforms around the adjacent element 212 and article 214. When in this position, a vacuum is applied, through port 230, pulling the membrane 240 tighter against the adjacent element 212 and article 214. The motor 278 is then engaged to rotate the exit duct 276 to the loading position shown in FIG. 17. In this position, the terminal end of the exit duct 276 is aligned with the first opening 250 in the top 248 of the media container 236. In this position, the hot sand duct 270 and the exit duct 276 are aligned to deliver the heated formable media 256 from the media chamber 254 to the media container 236. To release the formable media 256, the piston 274 is engaged to move the door 272 away from the exit port 268, allowing the heated formable media 256 to move, via gravity, from the media chamber 254 to the media container 236. The amount of media 256 is metered by the length of time the door 272 remains away from the exit port 268. As with the system 10 described above, the heated formable media 256 is left in place in the media container 236 in engagement with the membrane 240 for a time sufficient to fuse, bond or otherwise attach through heating, the article 214 and the element 212. After this time delay, the exit duct 276 is rotated to the stowed position by the motor 278, and the media container 236 is rotated by the motor 238 to dump the formable media 256 from the media container 236 into the return bucket 282, as shown in FIG. 18. In some aspects, the formable media 256 exits the media container 236 via the second opening 252. As shown in FIG. 18, the u-shaped front wall of the return bucket 282 allows overlap of the media container 236 and the return bucket 282. With the media container 236 in this position, the operator may remove the now coupled assembly of the article 214 and the element 212. At this point, the motor within the housing 292 engages the drive gear 290 to rotate the worm gear 286, elevating the return bucket 282 to the raised position shown in FIG. 19. Once the return bucket 282 is in the raised position, the piston 266 is engaged to move access door 264, allowing access to the internal volume of media chamber 254. With the access door 264 open, the motor 294 is engaged to rotate the return bucket 282, returning the formable media 256 to the media chamber 254 to be reheated (as shown in FIG. 20). The return bucket 282 is then lowered, and the process can begin again.

Figure 26:
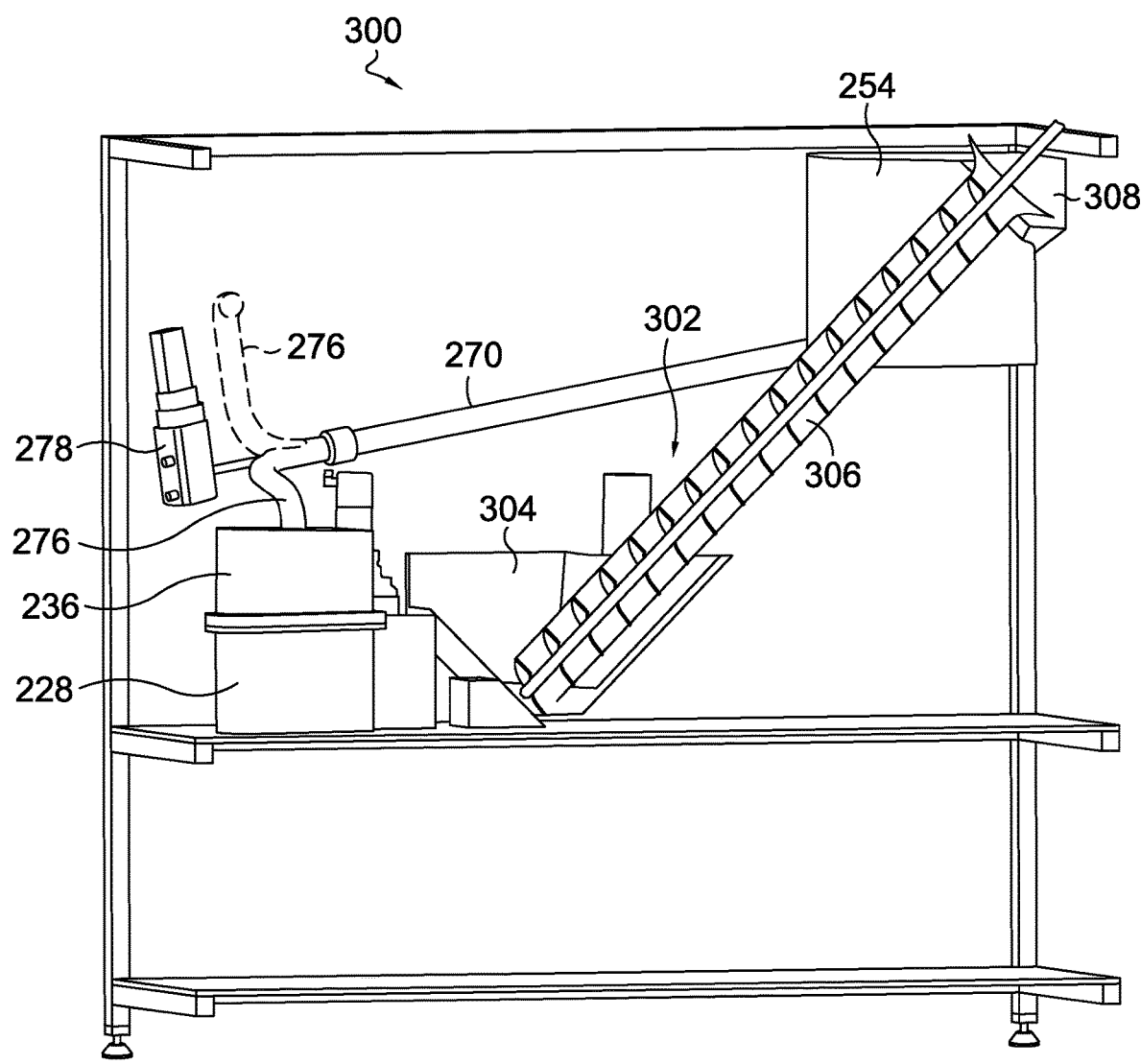
FIG. 26 is a cross-section view of an alternative aspect of a system for providing heat to an article, in accordance with aspects hereof.

FIG. 26 depicts another aspect of a system 300 for providing heat to an article. In some aspects, the system 300, like the system 10 and the system 200, can be used to thermo-couple or attach an element to an article. The system 300 is similar in many respects to the system 200 described above with reference to FIGS. 14-25. To that end, similar components are labeled with the same reference numbers from FIGS. 14-25. One difference in system 300 from system 200 relates to a return assembly 302 that replaces the return bucket 282 and the drive system of the worm gear 286, the driven gear 288 and the drive gear 290, along with the dump motor 294. In some aspects, the return assembly 302 includes a hopper 304 that receives formable media 256 as the media container 236 is pivoted away from the article container 228 by the motor 238. An auger 306 is powered by a motor (not shown). The auger 306 extends from the hopper 304 to the heated media chamber 254. As the motor turns the auger 306, formable media 256 within the hopper 304 is returned to the heated media chamber 254. In some aspects, the heated media chamber 254 of system 300 may have a return chute 308 to guide the formable media 256 into the media chamber 254.

Figure 27:
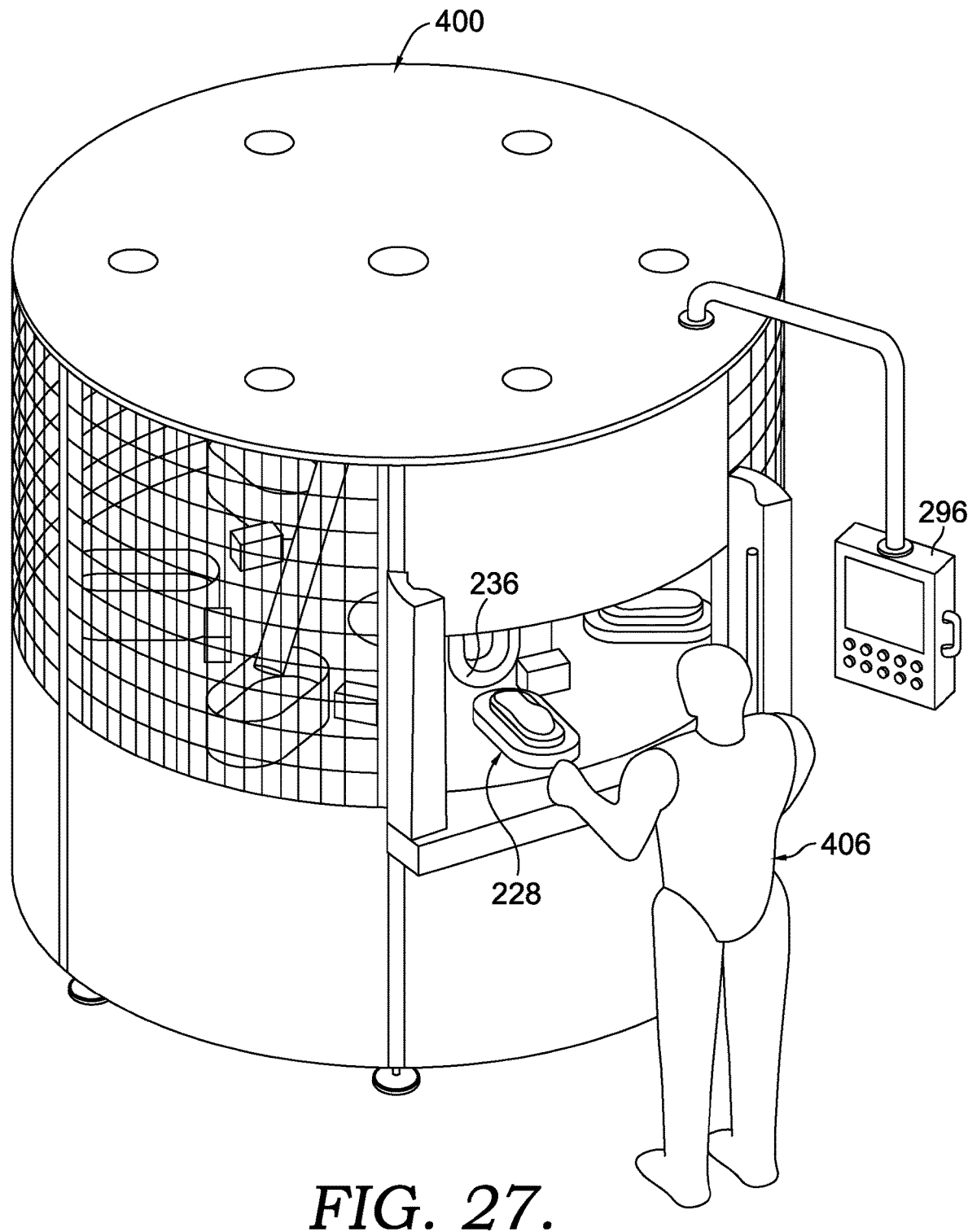
FIG. 27 is a perspective view of an alternative aspect of a system for providing heat to an article, in accordance with aspects hereof.
Figure 28:
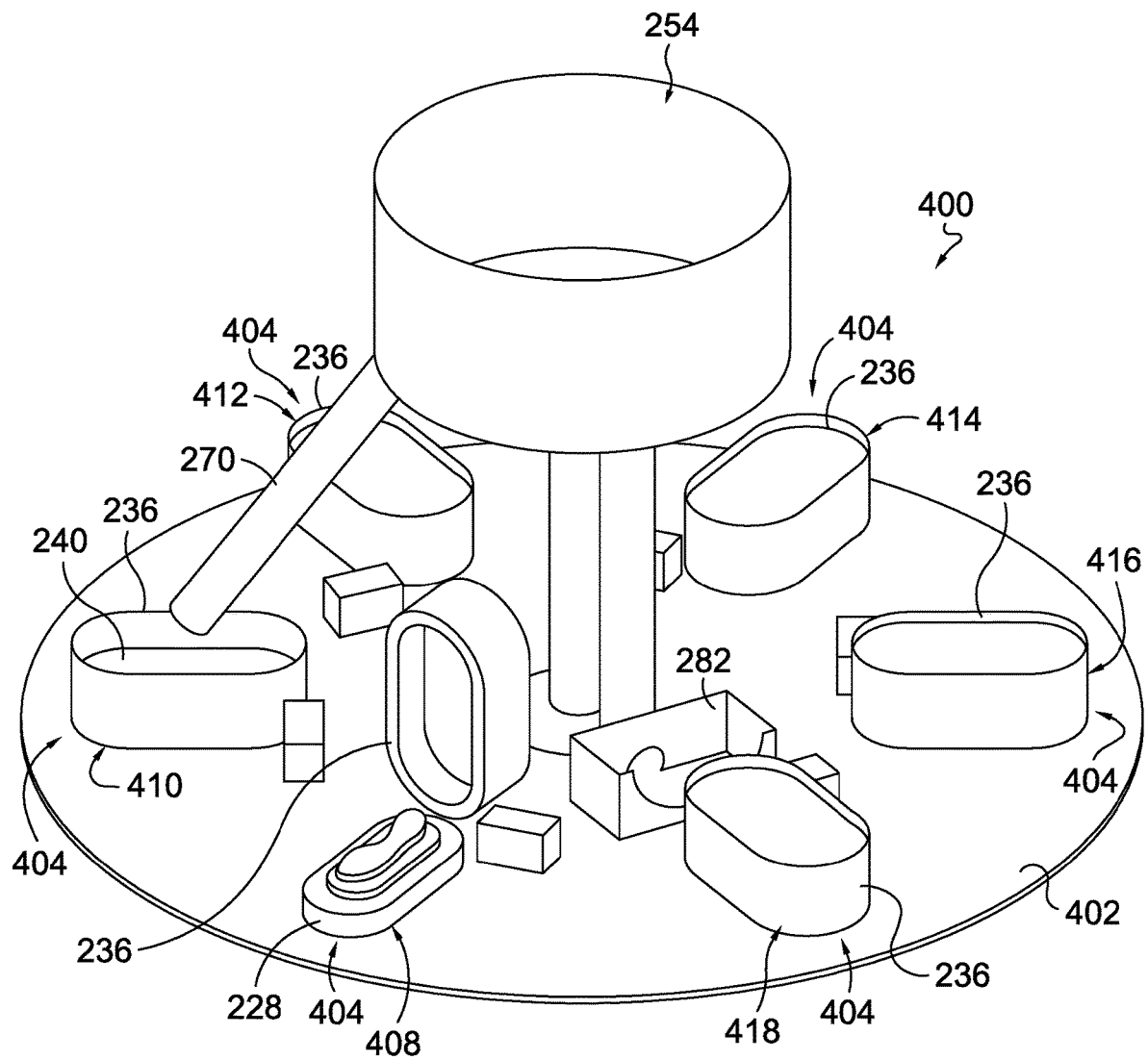
FIG. 28 is a schematic view showing the stations of FIG. 27.

FIGS. 27 and 28 depict yet another aspect of a system 400 for providing heat to an article. In some aspects, the system 400, like the system 10, the system 200, and the system 300, can be used to thermo-couple or attach an element to an article. The system 400 is similar in many respects to the system 200 described above with reference to FIGS. 14-25. To that end, similar components are labeled with the same reference numbers from FIGS. 14-25. System 400 differs from system 200 in that the system 400 is a rotary system with a platform 402 having multiple stations 404 positioned thereon, allowing multiple article and element assemblies to be in process at one time. In some aspects, each station 404 includes the article container 228 and media container 236 (as described above). FIG. 27 schematically depicts an operator 406 using the system 400. As with system 200, the operator 406 may place an article and element assembly within the article container 228 at a first position 408. In the first position 408, the media container 236 is pivoted away from the article container 228, allowing the operator 406 to place the article and element assembly into the article container 228. The operator 406 can interact with a control panel 296 to indicate the article and element are in place within the article container 228. As best seen in FIG. 28, with the article and element assembly in place, the media container 236 is rotated down and into place over the article container 228. For clarity, the basic components of system 400 are shown somewhat schematically. With the media container 236 in place over the article container 228, a vacuum is applied to the membrane 240 (not shown) as described above with respect to FIGS. 14-25. The system 400 then rotates (in one aspect via a motor below the platform 402) the platform 402 such that the station 404 is positioned below the hot sand duct 270, as indicated at a second position 410. When the station 404 is at the second position 410, heated formable media 256 is routed through the hot sand duct 270 from the heated media chamber 254. The platform 402 is then rotated again. When the station 404 is at positions labeled 412, 414 and 416, the heated formable media 256 transfers heat to the article and element to fuse or attach them together. The return bucket 282 is at a position labeled 418. As described above with respect to FIGS. 14-25, the media container 236 can be pivoted to dump the formable media 256 into the return bucket 282, which in turn, is elevated and dumped to return the formable media 256 to the heated media chamber 254. As the station 404 returns to the position 408, the operator 406 can remove the now coupled article and element, and place another article and element within the article container 228 for processing. Using the system 400, a number of article and element assemblies can be in process at the same time.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are aspects contemplated herein.

Clause 1. A method for attaching an element to an article, the method comprising: inserting at least a portion of the article over a form; placing the element on the article in a desired location; inserting the form, article and element at least partially within an article container; moving the form, article and element into engagement with a flexible membrane, the membrane and the article container forming an airtight chamber; exposing the airtight chamber to a pressure less than atmospheric pressure to pull the membrane against at least a portion of the article and the element; and exposing the membrane to a heated deformable media.

Clause 2. The method according to clause 1, wherein the article comprises a portion of an article of footwear.

Clause 3. The method according to any of clauses 1-2, wherein the portion of an article of footwear comprises an upper.

Clause 4. The method according to any of clauses 1-3, wherein the form comprises a last.

Clause 5. The method according to any of clauses 1-4, wherein the deformable media is sand.

Clause 6. The method according to any of clauses 1-5, wherein the flexible membrane forms a portion of a media container having a first chamber and a second chamber, and wherein the flexible membrane forms the bottom of the second chamber, the method further comprising heating the deformable media in the first chamber prior to exposing the membrane to the heated deformable media.

Clause 7. The method according to any of clauses 1-6, wherein the exposing the membrane to the deformable media comprises allowing the heated deformable media to flow from the first chamber of the media container to the second chamber of the media container.

Clause 8. The method according to any of clauses 1-7, further comprising exposing the membrane to the heated deformable media for a predetermined period of time.

Clause 9. The method according to any of clauses 1-8, further comprising, following the exposing the membrane to the heated deformable media, upending the media container such that the first chamber is on the bottom and the second chamber is on the top to allow the deformable media to return to the first chamber.

Clause 10. A system for providing heat to a three-dimensional article, the system comprising: an article container having an interior volume, the article container having at least one open face; a form selectively held at least partially within the article container, the form having a shape at least partially corresponding to the three-dimensional article, and adapted to hold the three-dimensional article; a media container having a first chamber and a second chamber, the first chamber and the second chamber separated by a selectively openable valve; a flexible membrane extending at least partially across a face of the second chamber of the media container; a deformable media held within the media container, the deformable media being held within the first chamber in a first condition when the selectively openable valve is in a closed position, and the deformable media being allowed to enter the second chamber when the selectively openable valve is in an open position; at least one heating element positioned to heat the deformable media when the deformable media is in the first chamber of the media container; an engagement mechanism coupled to the article container and adapted to move the article container such that the form is moved into engagement with the flexible membrane on the media container; and wherein the deformable media can be heated by the at least one heating element when the deformable media is in the first chamber and wherein the heated deformable media is allowed to enter the second chamber by opening the selectively openable valve, wherein the deformable media surrounds the flexible membrane.

Clause 11. The system according to clause 10, wherein the three-dimensional article is a footwear upper.

Clause 12. The system according to any of clauses 10-11, wherein the deformable media is sand.

Clause 13. The system according to any of clauses 10-12, further comprising a vacuum coupled to the article container, and wherein a negative pressure can be applied by the vacuum when the article container is engaged with the flexible membrane of the media container.

Clause 14. The system according to any of clauses 10-13, further comprising a plurality of heating elements, wherein the heating elements extend across and through the first chamber of the media container.

Clause 15. The system according to any of clauses 10-14, further comprising an actuator coupled to the article container, the actuator adapted to move the article container from a loading position distal from the media container to a forward position in alignment with the media container.

Clause 16. The system according to any of clauses 10-15, further comprising a motor coupled to the media container, the motor operable to rotate the media container from a first position wherein the first chamber is above the second chamber and a second position wherein the first chamber is below the second chamber.

Clause 17. A method for providing heat to an article is provided. The method can include inserting at least a portion of the article over a form. The method can further include inserting the form and article at least partially within an article container and moving into engagement the form and article and the flexible membrane. The method can further include exposing the membrane to a heated deformable media.

Clause 18. The method according to clause 17, wherein the moving the form and article into engagement with the flexible membrane forms an airtight chamber between the article container and the flexible membrane, further comprising exposing the airtight chamber to a pressure less than atmospheric pressure to pull the membrane against at least a portion of the article before the exposing the membrane to the heated deformable media.

Clause 19. The method according to any of clauses 17-18, further comprising heating the deformable media with at least one heating element prior to the exposing the membrane to the heated deformable media.

Clause 20. The method according to any of clauses 17-19, wherein the article comprises a portion of an article of footwear.

Clause 21. A system for providing heat to a three-dimensional article, the system comprising: an article container having an interior volume, the article container having at least one open face; a form selectively held at least partially within the article container, the form having a shape at least partially corresponding to the three-dimensional article, and adapted to hold the three-dimensional article; a media container pivotal with respect to the article container between an open position allowing access to the interior volume of the article container, and a closed position with the media container over the article container; a flexible membrane extending at least partially across the media container, the membrane covering the open face of the article container when the media container is in the closed position; a media chamber having at least one heating element and a selectively openable door; at least one duct between the media chamber and the media container, the duct providing access between the media chamber and the media container when the selectively openable door is in an open condition; a deformable media held within the media chamber for heating by the heating elements, the deformable media being held within the media chamber when the selectively openable door is in a closed position, and the deformable media being allowed to enter the duct and transferred to the media container when the selectively openable door is in an open position; and wherein the deformable media can be heated when the deformable media is in the media chamber and wherein the heated deformable media is allowed to enter the duct by opening the selectively openable door, wherein the deformable media is allowed to flow into the media container above the membrane.

Clause 22. The system according to clause 21, wherein the three-dimensional article is a footwear outsole.

Clause 23. The system according to any of clauses 21-22, wherein the deformable media is sand.

Clause 24. The system according to any of clauses 21-23, further comprising a vacuum coupled to the article container, and wherein a negative pressure can be applied by the vacuum when the article container is engaged with the flexible membrane of the media container.

Clause 25. The system according to any of clauses 21-24, further comprising a plurality of heating elements within the media chamber.

Clause 26. The system according to any of clauses 21-25, further comprising a motor coupled to the media container, the motor adapted to move the media container from the open position away from the article container to the closed position over the article container.

Clause 27. The system according to any of clauses 21-26, further comprising a return bucket moveable from a location adjacent the media container to a location adjacent the media chamber, the return bucket moveable to return the deformable media to the media chamber.

Clause 28. The system according to any of clauses 21-27, further comprising a hopper adjacent the media container and an auger extending from the hopper to the media chamber, the auger operable to return the deformable media from the hopper to the media chamber.

Clause 29. The system according to any of clauses 21-28, further comprising a rotatable platform supporting multiple stations, each station having an article container and a media container.

The invention claimed is:

1. A system for providing heat to a three-dimensional article, the system comprising:
   an article container having an interior volume, the article container having at least one open face;
   a form selectively held at least partially within the article container, the form having a shape at least partially corresponding to the three-dimensional article, and adapted to hold the three-dimensional article;
   a media container having a first chamber and a second chamber the first chamber and the second chamber separated by a selectively openable valve;
   a flexible membrane extending at least partially across a face of the second chamber of the media container;
   a deformable media held within the media container, the deformable media being held within the first chamber in a first condition when the selectively openable valve is in a closed position, and the deformable media being allowed to enter the second chamber when the selectively openable valve is in an open position;
   at least one heating element positioned to heat the deformable media when the deformable media is in the first chamber of the media container;
   an engagement mechanism coupled to the article container and adapted to move the article container such that the form is moved into engagement with the flexible membrane on the media container; and
   wherein the deformable media can be heated by the at least one heating element when the deformable media is in the first chamber and wherein the heated deformable media is allowed to enter the second chamber by opening the selectively openable valve, wherein the deformable media surrounds the flexible membrane.

2. The system according to claim 1, wherein the three-dimensional article is a footwear upper.

3. The system according to claim 1, wherein the deformable media is sand.

4. The system according to claim 1, further comprising a vacuum coupled to the article container, and wherein a negative pressure can be applied by the vacuum when the article container is engaged with the flexible membrane of the media container.

5. The system according to claim 1, further comprising a plurality of heating elements, wherein the heating elements extend across and through the first chamber of the media container.

6. The system according to claim 1, further comprising an actuator coupled to the article container, the actuator adapted to move the article container from a loading position distal from the media container to a forward position in alignment with the media container.

7. The system according to claim 1, further comprising a motor coupled to the media container, the motor operable to rotate the media container from a first position wherein the first chamber is above the second chamber and a second position wherein the first chamber is below the second chamber.

8. A system for providing heat to a three-dimensional article, the system comprising:
   an article container having an interior volume, the article container having at least one open face;
   a form selectively held at least partially within the article container, the form having a shape at least partially corresponding to the three-dimensional article, and adapted to hold the three-dimensional article;
   a media container pivotal with respect to the article container between an open position allowing access to the interior volume of the article container, and a closed position with the media container over the article container;
   a flexible membrane extending at least partially across the media container, the membrane covering the open face of the article container when the media container is in the closed position;
   a media chamber having at least one heating element and a selectively openable door;
   at least one duct between the media chamber and the media container, the duct providing access between the media chamber and the media container when the selectively openable door is in an open condition;

a deformable media held within the media chamber for heating by the at least one heating element, the deformable media being held within the media chamber when the selectively openable door is in a closed position, and the deformable media being allowed to enter the duct and transferred to the media container when the selectively openable door is in an open position; and wherein the deformable media can be heated when the deformable media is in the media chamber and wherein the heated deformable media is allowed to enter the duct by opening the selectively openable door, wherein the deformable media is allowed to flow into the media container above the membrane.

9. The system according to claim 8, wherein the three-dimensional article is a footwear outsole.

10. The system according to claim 8, wherein the deformable media is sand.

11. The system according to claim 8, further comprising a vacuum coupled to the article container, and wherein a negative pressure can be applied by the vacuum when the article container is engaged with the flexible membrane of the media container.

12. The system according to claim 8, further comprising a plurality of heating elements within the media chamber.

13. The system according to claim 8, further comprising a motor coupled to the media container, the motor adapted to move the media container from the open position away from the article container to the closed position over the article container.

14. The system according to claim 8, further comprising a return bucket moveable from a location adjacent the media container to a location adjacent the media chamber, the return bucket moveable to return the deformable media to the media chamber.

15. The system according to claim 8, further comprising a hopper adjacent the media container and an auger extending from the hopper to the media chamber, the auger operable to return the deformable media from the hopper to the media chamber.

16. The system according to claim 8, further comprising a rotatable platform supporting multiple stations, each station having an article container and a media container.

* * * * *